(12) United States Patent
Sim et al.

(10) Patent No.: US 11,586,083 B2
(45) Date of Patent: *Feb. 21, 2023

(54) LIQUID CRYSTAL DISPLAY DEVICE

(71) Applicant: Samsung Display Co., Ltd., Yongin-Si (KR)

(72) Inventors: Jun Bo Sim, Asan-si (KR); Yeun Tae Kim, Hwaseong-si (KR); Do Yeong Park, Hwaseong-si (KR); Se Hyun Lee, Hwaseong-si (KR)

(73) Assignee: Samsung Display Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/831,702

(22) Filed: Mar. 26, 2020

(65) Prior Publication Data

US 2020/0225544 A1 Jul. 16, 2020

Related U.S. Application Data

(63) Continuation of application No. 16/001,672, filed on Jun. 6, 2018, now Pat. No. 10,620,497.

(30) Foreign Application Priority Data

Oct. 26, 2017 (KR) .................. 10-2017-0140117

(51) Int. Cl.
*G02F 1/1362* (2006.01)
*G02F 1/1339* (2006.01)
(Continued)

(52) U.S. Cl.
CPC ...... *G02F 1/136227* (2013.01); *G02F 1/1368* (2013.01); *G02F 1/13394* (2013.01);
(Continued)

(58) Field of Classification Search
CPC ............ G02F 1/133345; G02F 1/1368; G02F 1/136227; G02F 1/134363;
(Continued)

(56) References Cited

U.S. PATENT DOCUMENTS 8,854,579 B2 10/2014 Chang et al.
9,488,873 B2 11/2016 Jia et al.
(Continued)

FOREIGN PATENT DOCUMENTS

CN 102073171 A 5/2011
CN 104407475 A 3/2015
(Continued)

OTHER PUBLICATIONS

Extended European Search Report, Application No. 18190847.6, dated Jan. 28, 2019, 7 pages.
(Continued)

*Primary Examiner* — Hoan C Nguyen
(74) *Attorney, Agent, or Firm* — Innovation Counsel LLP

(57) ABSTRACT

A liquid crystal display device includes a first substrate; a switching element including a control electrode disposed on the first substrate, one electrode disposed on the control electrode, and another electrode disposed on the control electrode and spaced apart from the one electrode; a contact hole extending to at least a part of the another electrode of the switching element; a pixel electrode including a contact portion disposed on the another electrode of the switching element and overlapping at least a part of the another electrode to which the contact hole extends, and a body portion electrically connected with the contact portion; and a column spacer disposed on the pixel electrode and at least partially overlapping the contact hole.

11 Claims, 22 Drawing Sheets

(51) Int. Cl.
*G02F 1/1337* (2006.01)
*G02F 1/1343* (2006.01)
*G02F 1/1368* (2006.01)

(52) U.S. Cl.
CPC .... *G02F 1/13439* (2013.01); *G02F 1/133707* (2013.01); *G02F 1/134309* (2013.01); *G02F 1/136209* (2013.01); *G02F 1/13398* (2021.01); *G02F 1/136222* (2021.01)

(58) Field of Classification Search
CPC ......... G02F 1/133784; G02F 1/133516; G02F 1/133512; G02F 1/13394; G02F 2001/13398; G02F 1/136209; G02F 2001/136218; G02F 2001/13396; G02F 2001/136222; G02F 2001/134345; G02F 2202/103; G02F 2202/10; G02F 2201/52; G02F 2001/136295; G02F 1/136286; H01L 27/124; H01L 27/1222; H01L 29/78669; H01L 29/66969; H01L 29/66765; H01L 27/1262; H01L 27/1225; H01L 29/78693
See application file for complete search history.

(56) References Cited

U.S. PATENT DOCUMENTS

| | | | |
|---|---|---|---|
| 9,500,912 | B2 | 11/2016 | Wu et al. |
| 9,791,748 | B2 | 10/2017 | Chang et al. |
| 10,613,399 | B2 | 4/2020 | Park et al. |
| 2006/0066788 | A1 | 3/2006 | Utsumi et al. |
| 2010/0134731 | A1 | 6/2010 | Jeon et al. |
| 2011/0122357 | A1 | 5/2011 | Chang et al. |
| 2013/0100386 | A1 | 4/2013 | Kim et al. |
| 2013/0264573 | A1 | 10/2013 | Nagami |
| 2013/0329155 | A1 | 12/2013 | Kwak et al. |
| 2015/0022766 | A1 | 1/2015 | Kim et al. |
| 2015/0062521 | A1 | 3/2015 | Son et al. |
| 2015/0168772 | A1* | 6/2015 | Jung ............... G02F 1/136209 349/106 |
| 2015/0192810 | A1* | 7/2015 | Koo ............... G02F 1/136286 349/46 |
| 2016/0161788 | A1 | 6/2016 | Wu et al. |
| 2016/0195745 | A1* | 7/2016 | Xu ............... H01L 29/4908 349/43 |
| 2016/0202528 | A1 | 7/2016 | Kang et al. |
| 2016/0202543 | A1 | 7/2016 | Park et al. |
| 2016/0202582 | A1 | 7/2016 | Paek et al. |
| 2016/0246133 | A1* | 8/2016 | Chang ............... G02F 1/1337 |
| 2016/0320678 | A1* | 11/2016 | Shin ............... G02F 1/134309 |
| 2017/0075175 | A1* | 3/2017 | Namgung ......... G02F 1/134336 |
| 2017/0097538 | A1* | 4/2017 | Cho ............... G02F 1/133512 |
| 2017/0147110 | A1 | 5/2017 | Xu |
| 2017/0192322 | A1 | 7/2017 | Jung et al. |
| 2017/0285414 | A1* | 10/2017 | Ahn ............... G02F 1/134363 |
| 2017/0322462 | A1* | 11/2017 | Lee ............... G02F 1/133345 |
| 2017/0363917 | A1* | 12/2017 | Shin ............... G02F 1/1368 |
| 2018/0275471 | A1 | 8/2018 | Park et al. |

FOREIGN PATENT DOCUMENTS

| | | |
|---|---|---|
| CN | 104423108 A | 3/2015 |
| CN | 106990631 A | 7/2017 |
| KR | 10-2013-0137457 A | 12/2013 |
| KR | 10-2015-0056110 A | 5/2015 |
| KR | 10-2015-0070776 A | 6/2015 |
| KR | 10-2016-0086524 A | 7/2016 |
| KR | 10-2017-0010277 A | 1/2017 |
| KR | 10-2018-0107442 A | 10/2018 |

OTHER PUBLICATIONS

EPO Office Action Report, Application No. 18190847.6, dated Feb. 20, 2020, 6 pages.

* cited by examiner

LIQUID CRYSTAL DISPLAY DEVICE

This application is a continuation application of U.S. patent application Ser. No. 16/001,672 filed on Jun. 6, 2018, now U.S. Pat. No. 10,620,497, which claims priority under 35 USC § 119 to Korean Patent Application No. 10-2017-0140117, filed on Oct. 26, 2017, in the Korean Intellectual Property Office, the disclosures of which are incorporated herein by reference in their entirety.

BACKGROUND

1. Field

The present application relates to a liquid crystal display device.

2. Description of the Related Art

The importance of a display device has increased with the development of multimedia. Accordingly, various types of display devices such as a liquid crystal display (LCD) and an organic light emitting display (OLED) have been used.

Among display devices, a liquid crystal display device, which is one of the most widely used flat panel display devices, includes two substrates including electric field generating electrodes such as a pixel electrode and a common electrode and a liquid crystal layer disposed therebetween. In the liquid crystal display device, a voltage is applied to the electric field generating electrodes to form an electric field in the liquid crystal layer, so that the alignment of liquid crystal molecules in the liquid crystal layer is determined, and the polarization of incident light is controlled, thereby displaying an image.

SUMMARY

An aspect of the inventive concept is to provide a liquid crystal display device that can prevent the occurrence of cracks.

Another aspect of the inventive concept is to provide a liquid crystal display device that can reduce the reflectance due to external light and improve a contrast ratio.

An exemplary embodiment discloses a liquid crystal display device, comprising: a first substrate; a switching element including a control electrode disposed on the first substrate, one electrode disposed on the control electrode, and another electrode disposed on the control electrode and spaced apart from the one electrode. A contact hole extends to at least a part of the another electrode of the switching element. A pixel electrode includes a contact portion disposed on the another electrode of the switching element and overlapping at least a part of the another electrode to which the contact hole extends, and a body portion electrically connected with the contact portion. A column spacer is disposed on the pixel electrode and at least partially overlapping the contact hole. The body portion includes a stem extending in a first direction and an edge disposed between the stem and the contact portion to be connected with the stem and extending in a second direction intersecting the first direction. The column spacer is spaced apart from the edge by a first distance on a plane.

An exemplary embodiment also discloses a liquid crystal display device, comprising: a pixel unit defined by a non-pixel area and a pixel area disposed adjacent to the non-pixel area; and a column spacer overlapping a contact hole disposed in the non-pixel area. The pixel unit includes a pixel electrode including a contact portion at least partially overlapping the contact hole and a body portion disposed in the pixel area and electrically connected with the contact portion. The body portion includes a stem disposed in the pixel area and extending in a first direction and an edge connected with the stem and extending in a second direction intersecting the first direction. The column spacer is spaced apart from the edge on a plane.

However, aspects of the inventive concept are not restricted to the ones set forth herein. The above and other aspects of the inventive concept will become more apparent to one of ordinary skill in the art to which the inventive concept pertains by referencing the detailed description given below.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION OF THE EMBODIMENTS

Hereinafter, embodiments will be described with reference to the attached drawings.

Figure 1:
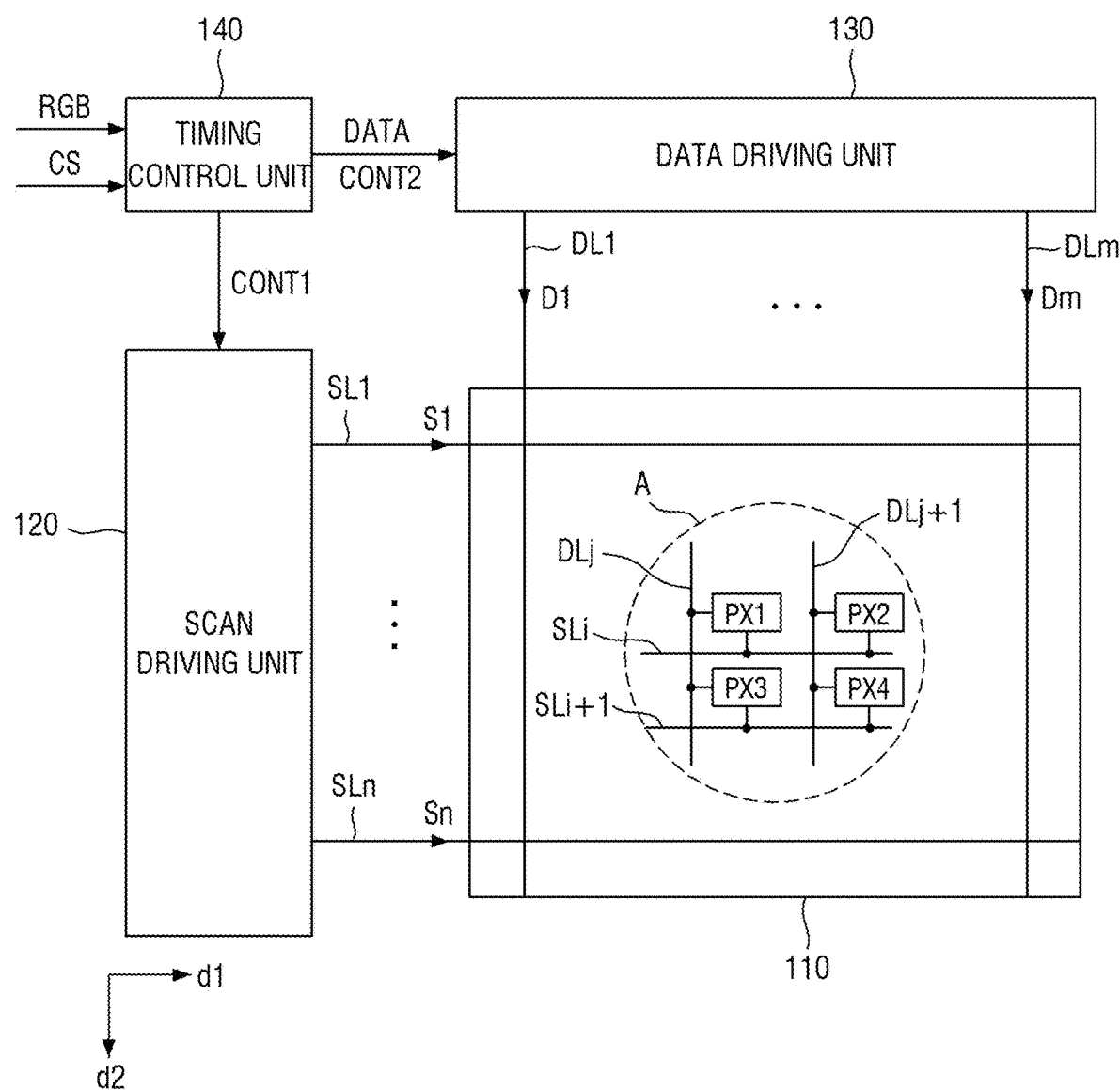
FIG. 1 is a view schematically showing first to fourth pixel units included in a liquid crystal display device according to an embodiment.

FIG. 1 is a view schematically showing a liquid crystal display device according to an embodiment.

Referring to FIG. 1, a liquid crystal display device according to an embodiment may include a display unit 110, a scan driving unit 120, a data driving unit 130, and a timing control unit 140.

The display unit 110 is defined as an area for displaying an image. The display unit 110 may be electrically connected with the scan driving unit 120 through 1st to n-th scan lines SL1 to SLn (n is a natural number of 2 or more) extending in a first direction d1. Further, the display unit 110 may be electrically connected with the data driving unit 130 through 1st to m-th data lines DL1 to DLm (m is a natural number of 2 or more) extending in a second direction d2. The first direction d1 may intersect the second direction d2 in an embodiment. Referring to FIG. 1, the first direction d1 is exemplified as a row direction, and the second direction d2 is exemplified as a column direction.

A plurality of pixel units including first to fourth pixel units PX1 to PX4 is arranged in the display unit 110. The plurality of pixel units will be described in more detail with reference to FIG. 2 based on the first to fourth pixel units PX1 to PX4.

The scan driving unit 120 may generate a plurality of scan signals S1 to Sn based on a first control signal CONT1 received from the timing control unit 140. The scan driving unit 120 may provide the generated plurality of scan signals S1 to Sn to the display unit 110 through the plurality of scan lines SL1 to SLn.

The data driving unit 130 may receive a second control signal CONT2 and image data DATA from the timing control unit 140. The data driving unit 130 may generate a plurality of data signals D1 to Dm based on the second control signal CONT2 and the image data DATA. The data driving unit 130 may provide the generated plurality of data signals D1 to Dm to the display unit 110 through the plurality of data lines DL1 to DLm. In an embodiment, the data driving unit 130 may include a shift register, a latch, and a digital-analog converter.

The timing control unit 140 may receive an image signal RGB and a control signal CS. The timing control unit 140 processes the image signal RGB and the control signal in accordance with the operation conditions of the display unit 110, so as to generate the image data DATA, the first control signal CONT1, and the second control signal CONT2. Here, the image signal RGB may include a plurality of gradation data to be provided to the display unit 110. Further, in an embodiment, the control signal CS may include a horizontal synchronization signal, a vertical synchronization signal, and a main clock signal. The horizontal synchronization signal represents the time taken to display one line of the display unit 110. The vertical synchronization signal represents the time taken to display an image of one frame. The main clock signal is a signal used as a reference for generating various signals in synchronization with the scan driving unit 120 and the data driving unit 130, respectively, by the timing control unit 140.

Hereinafter, the first to fourth pixel units PX1 to PX4 arranged in the area A will be described in more detail with reference to FIG. 2.

Figure 2:
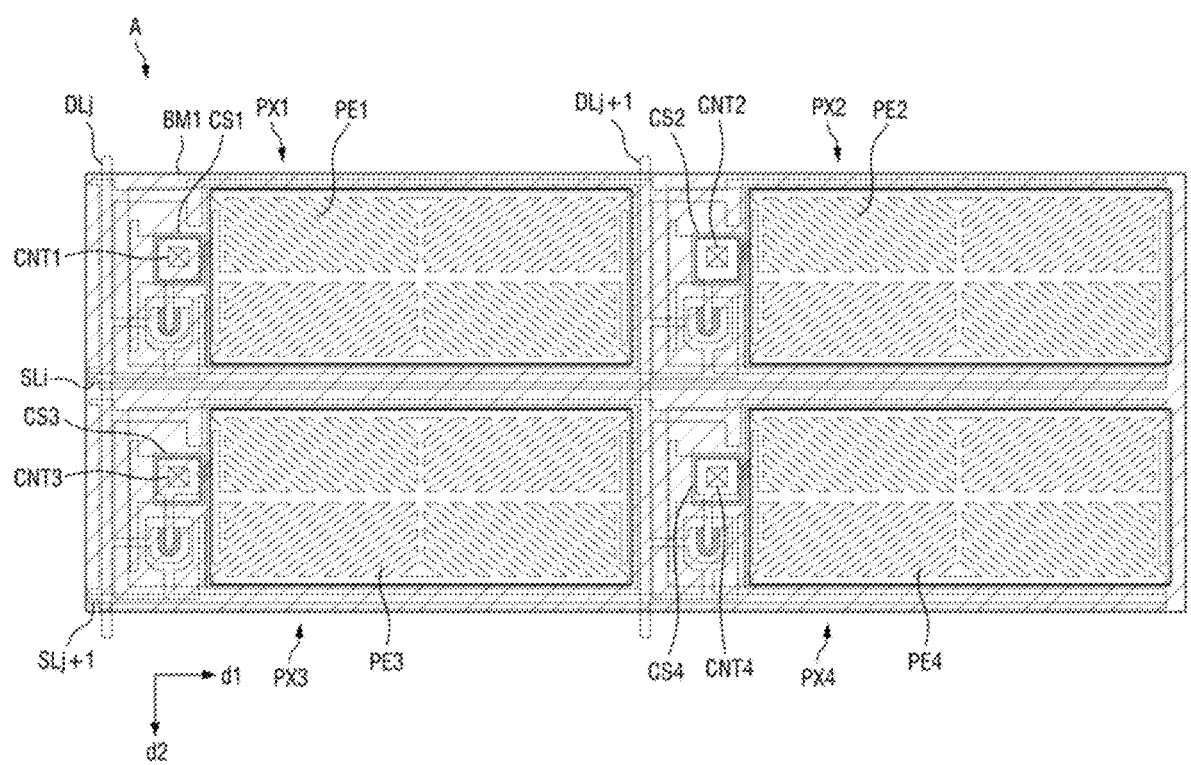
FIG. 2 is a layout view more specifically showing the first to fourth pixel units arranged in an area A shown in FIG. 1.

FIG. 2 is a layout view more specifically showing the first to fourth pixel units PX1 to PX4 arranged in the area A shown in FIG. 1.

Referring to FIGS. 1 and 2, the first pixel unit PX1 may be disposed adjacent to the second pixel unit PX2 along the first direction d1, and may be disposed adjacent to the third pixel unit PX3 along the second direction d2. The third pixel unit PX3 and the fourth pixel unit PX4 may be disposed adjacent to each other along the first direction d1. That is, the first to fourth pixel units PX1 to PX4 may be respectively disposed in areas defined by an i-th scan line SLi (i is a natural number of 1 or more), a i+1-th scan line SLi+1, a j-th data line DLj (j is a natural number of 1 or more), and a j+1-th data line DLj+1.

In an embodiment, the first pixel unit PX1 and the second pixel unit PX2 may express the same color. Further, the third pixel unit PX3 and the fourth pixel unit PX4 may express the same color. In contrast, the first pixel unit PX1 and the third pixel unit PX3 may express may different colors from each other, and the second pixel unit PX2 and the fourth pixel unit PX4 may different colors from each other. That is, in the liquid crystal display device according to an embodiment, the same color may be expressed between the pixel units arranged along the first direction d1. However, the expression colors of the first to fourth pixel units PX1 to PX4 are not limited thereto, and may vary depending on the shape of a pixel electrode and the connection relationship with other components.

The first, second, third, and fourth pixel units PX1, PX2, PX3, and PX4 may include first, second, third, and fourth pixel electrodes PE1, PE2, PE3, and PE4, respectively. Each of the first to fourth pixel electrodes PE1 to PE4 may have a long side extending along the first direction d1 and a short side extending on the second direction d2. That is, in an embodiment, the first to fourth pixel electrodes PE1 to PE4 may have a horizontal pixel structure.

Each of the first to fourth pixel electrodes PE1 to PE4 may partially overlap a black matrix BM1. Further, each of the first, second, third, and fourth pixel electrodes PE1, PE2, PE3, and PE4 may partially overlap first, second, third, and fourth column spacers CS1, CS2, CS3, and CS4. For example, a part of the first pixel electrode PE1, more specifically, a first body portion PE1b (refer to FIG. 3) of the first pixel electrode PE1 does not overlap the first column spacer CS1. The first body portion PE1b may also be spaced apart from the first column spacer CS1 by a predetermined distance. Meanwhile, the first, second, third, and fourth column spacers CS1, CS2, CS3, and CS4 may overlap first, second, third, and fourth contact holes CNT1, CNT2, CNT3, and CNT4.

The plurality of column spacers including the first to fourth column spacers CS1 to CS4 may be formed of the same material as the black matrix BM1. That is, the plurality of column spacers and the black matrix BM1 may be black column spacers BCS formed simultaneously through the same process.

Hereinafter, the switching elements, pixel electrodes and column spacers included in the first to fourth pixel units PX1 to PX4 will be described in detail based on the first pixel unit PX1. For convenience of explanation, the first column spacer CS1 and the black matrix BM1 will be referred to as black column spacers BCS.

Figure 3:
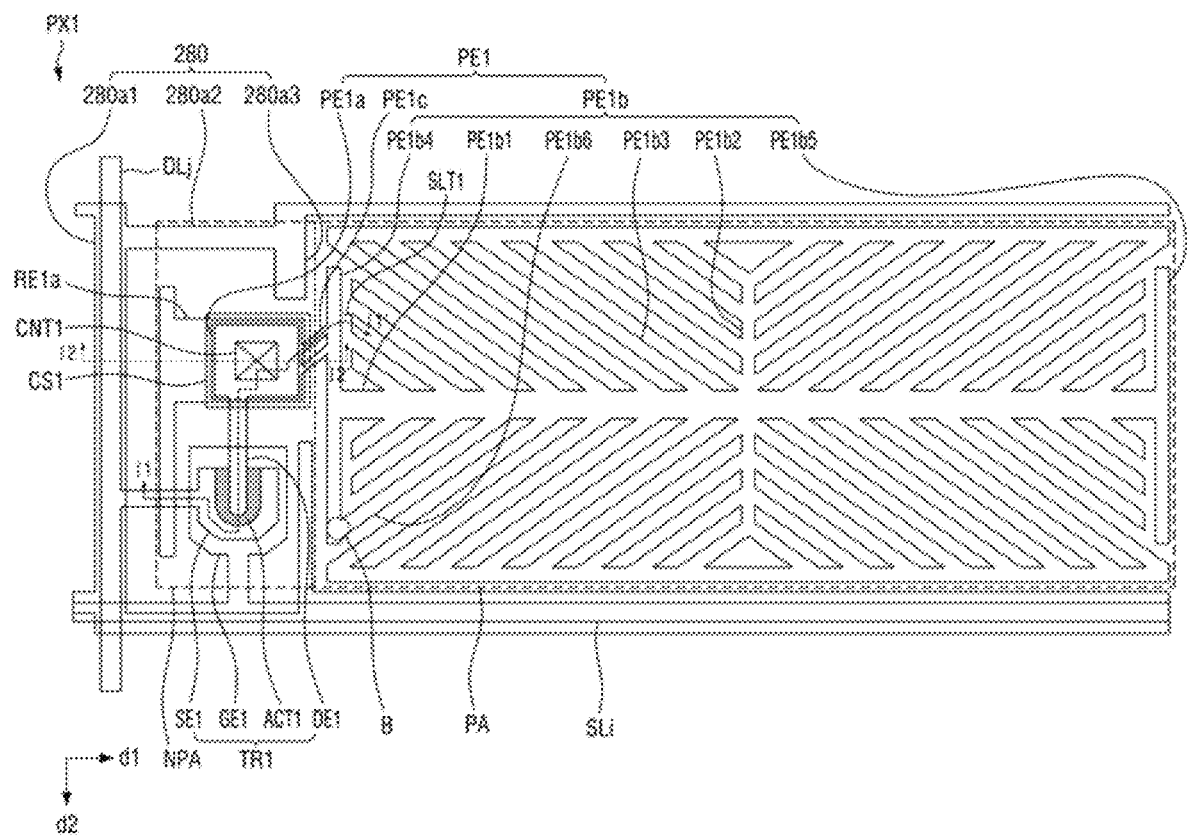
FIG. 3 is a layout view more specifically showing the first pixel unit.

FIG. 3 is a layout view more specifically showing the first pixel unit PX1. However, in FIG. 3, the black matrix BM1 shown in FIG. 2 will not be shown.

Referring to FIG. 3, the first pixel unit PX1 may include a first switching element TR1 and the first pixel electrode PE1. The first switching element TR1 may be a thin film transistor having an input electrode, an output electrode, and a control electrode. Hereinafter, the input electrode is referred to as a source electrode SE1, the output electrode is referred to as a drain electrode DE1, and the control electrode is referred to as a gate electrode GE1.

The first switching element TR1 may include the first gate electrode GE1 electrically connected with the i-th scan line SLi, the first source electrode SE1 electrically connected with the j-th data line DLj, and the first drain electrode DE1 electrically connected with the first pixel electrode PE1. Here, the first drain electrode DE1 of the first switching element TR1 may be electrically connected with the first pixel electrode PE1 through the first contact hole CNT1. The first switching element TR1 may perform a switching operation based on the i-th scan signal Si received from the i-th scan line SLi to provide a j-th data signal Dj received from the j-th data line DLj to the first pixel electrode PE1.

The first pixel electrode PE1 may include a first contact portion PE1$a$ and the first body portion PE1$b$. The first pixel electrode PE1 may further include a first connection portion PE1$c$ disposed between the first contact portion PE1$a$ and the first body portion PE1$b$ and connecting the first contact portion PE1$a$ and the first body portion PE1$b$ to each other.

The first contact portion PE1$a$ is directly connected with a part of the first drain electrode DE1 exposed by the first contact hole CNT1. The first connection portion PE1C extends from the first contact portion PE1$a$ to electrically connect the first contact portion PE1$a$ and the first body portion PE1$b$. The first body portion PE1$b$ may overlap a common electrode CE (refer to FIG. 4) to be described later to form an electric field, thereby controlling the alignment of liquid crystal molecules 410 to transmit light to the outside. However, the first contact portion PE1$a$, the first body portion PE1$b$, and the first connection portion PE1$c$ are separated for convenience, and the boundaries of the respective components are not limited to those shown in FIG. 3. In this specification, the expression "the first component and the second component overlap each other" means that the first component and the second component overlap each other in a vertical direction with respect to a first substrate 210 (refer to FIG. 4).

The first pixel unit PX1 may be divided into a pixel area PA and a non-pixel area NPA. Hereinafter, the first contact portion PE1$a$, the first body portion PE1$b$, and the first connection portion PE1$c$ will be described in more detail in consideration of the relationship with the pixel area PA or the non-pixel area NPA.

First, the definition of the pixel area PA and the non-pixel area NPA will be described.

The first pixel unit PX1 may be divided into the pixel area PA and the non-pixel area NPA disposed adjacent to the pixel area PA. The pixel area PA is defined as an area where an image is substantially displayed. The non-pixel area NPA is defined as an area where the image is not displayed, the area being disposed adjacent to the pixel area PA. That is, the non-pixel area NPA means an area where light is not emitted to the outside by overlapping the black matrix BM1 (refer to FIG. 2). Meanwhile, the boundary between the pixel area PA and the non-pixel area NPA is not limited to that shown in FIG. 3, and may be changed depending on the arrangement of the first to fourth pixel units PX1 to PX4 or the arrangement of the components included in the first to fourth pixel units PX1 to PX4.

Next, the first contact portion PE1$a$, the first body portion PE1$b$ and the first connection portion PE1$c$ of the first pixel electrode PE1 will be described in more detail based on the definition of the pixel area PA and the non-pixel areas NPA.

The first contact portion PE1$a$ is disposed in the non-pixel area NPA. That is, the first contact portion PE1$a$ may also be defined as a portion not overlapping the pixel area PA in the first pixel electrode PE1. The first contact portion PE1$a$ is directly connected with a conductive electrode disposed in the non-pixel area NPA. That is, the first contact portion PE1$a$ may be connected with at least a part of the first drain electrode DE1 through the first contact hole CNT1.

The first body portion PE1$b$ is disposed in the pixel area PA. That is, the first body portion PE1$b$ may be defined as a portion not overlapping the non-pixel area NPA in the first pixel electrode PE1. The first body portion PE1$b$ may include a first stem PE1$b$1 extending in the first direction d1 and a second stem PE1$b$2 extending in the second direction d2 and intersecting the first stem PE1$b$1. In an embodiment, the first stem PE1$b$1 may intersect the second stem PE1$b$2 at the center of the body portion PE1$b$. The first stem PE1$b$1 and the second stem PE1$b$2 may form a cross shape. Therefore, the first body portion PE1$b$ may include four domain regions formed by the first stem PE1$b$1 and the second stem PE1$b$2.

The first body portion PE1$b$ may further include a plurality of first branches PE1$b$3 disposed in the four domain regions. A plurality of first branches PE1$b$3 may extend from one of the first stem PE1$b$1 and the second stem PE1$b$2 to the four domain regions. The plurality of first branches PE1$b$3 may be spaced apart from the neighboring first branch. Therefore, the first body portion PE1$b$ may further include a plurality of first slits SLT1 defined between the plurality of first branches PE1$b$3 spaced apart from each other.

The first body portion PE1$b$ may further include a first edge PE1$b$4 and a second edge PE1$b$5. The first edge PE1$b$4 and the second edge PE1$b$5 may extend along the second direction d2. The first edge PE1$b$4 may be connected with the first connection portion PE1$c$ to be described later and one side of the first stem PE1$b$1. That is, the first stem PE1$b$1 may extend from the first edge PE1$b$4 along the first direction d1. The second edge PE1$b$5 may be connected with the other side of the first stem PE1$b$1 facing the one side thereof. The shapes and arrangement positions of the first edge PE1$b$4 and the second edge PE1$b$5 are not limited to those shown in FIG. 3. For example, the first edge PE1$b$4 and the second edge PE1$b$5 may be disposed to extend along the i-th scan line SLi or the i+1-th scan line (not shown in the drawings).

The first connection portion PE1$c$ may overlap both the pixel area PA and the non-pixel area NPA. That is, the first connection portion PE1$c$ may be disposed between the first contact portion PE1$a$ disposed in the non-pixel area NPA and the first body portion PE1$b$ disposed in the pixel area PA to connect the first contact portion PE1$a$ and the first body portion PE1$b$ to each other. Although it is shown in FIG. 3 that the number of the first connection portions PE1$c$ is two, the embodiments are not limited thereto. That is, the number of the first connection portions PE1$c$ may be one, or may also be two or more.

Meanwhile, at least one of the plurality of first branches PE1$b$3 of the first body portion PE1$b$ may be directly connected with the first edge PE1$b$4. Referring to FIG. 3, in the area B, one of the plurality of first branches PE1b3 is directly connected with the first edge PE1b4. Hereinafter, the first branch is referred to as an edge branch PE1b6. That is, the edge branch PE1b6 is defined as a branch directly connected with the first edge PE1b4 of the plurality of first branches PE1b3. The edge branch PE1b6 will be described later.

The first column spacer CS1 is disposed between a first substrate 210 (refer to FIG. 4) and a second substrate 310 (refer to FIG. 4) to main a cell gap between the first substrate 210 and the second substrate 310. The first column spacer CS1 may overlap the first contact hole CNT1. The first column spacer CS1, as shown in FIG. 3, may be formed to completely cover the first contact hole CNT1. In other words, the first contact hole CNT1 may completely overlap the first column spacer CS1.

The black matrix BM1 can prevent light from being transmitted to the remaining area except for the pixel area PA. For example, the black matrix BM1 may overlap the i-th scan line SLi as well as the non-pixel area NPA. Thus, the black matrix BM1 can prevent light from being transmitted to an area overlapping the non-pixel area NPA and the i-th scan line SLi.

The first column spacer CS1 may protrude from the black matrix BM1. As described above, in an embodiment, the first column spacer CS1 and the black matrix BM1 may be made of the same material. For example, the first column spacer CS1 and the black matrix BM1 may be made of a photosensitive composition, an organic material, or a metallic material. In an embodiment, the photosensitive composition may include a binder resin, a polymerizable monomer, a polymerizable oligomer, a pigment, a dispersant, and the like. The metallic material may include chromium and the like.

Hereinafter, the position where the first pixel electrode PE1, the first column spacer CS1, the black matrix BM1, and the first contact hole CNT1 are arranged and the relationship with other components will be described in more detail with reference to FIGS. 4 to 10. Even in FIGS. 4 to 10, details will be described based on the first pixel unit PX1.

Figure 4:
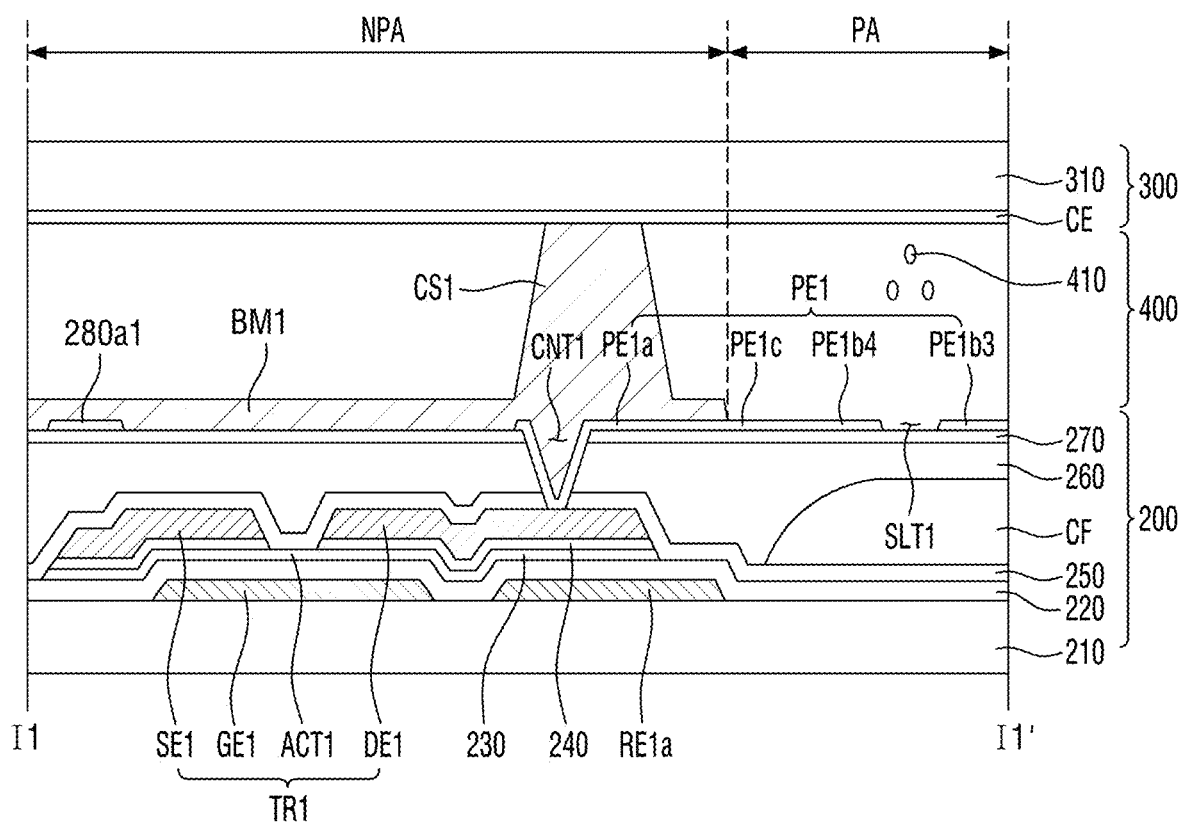
FIG. 4 is a sectional view taken along the line I1-I1' shown in FIG. 3.
Figure 5:
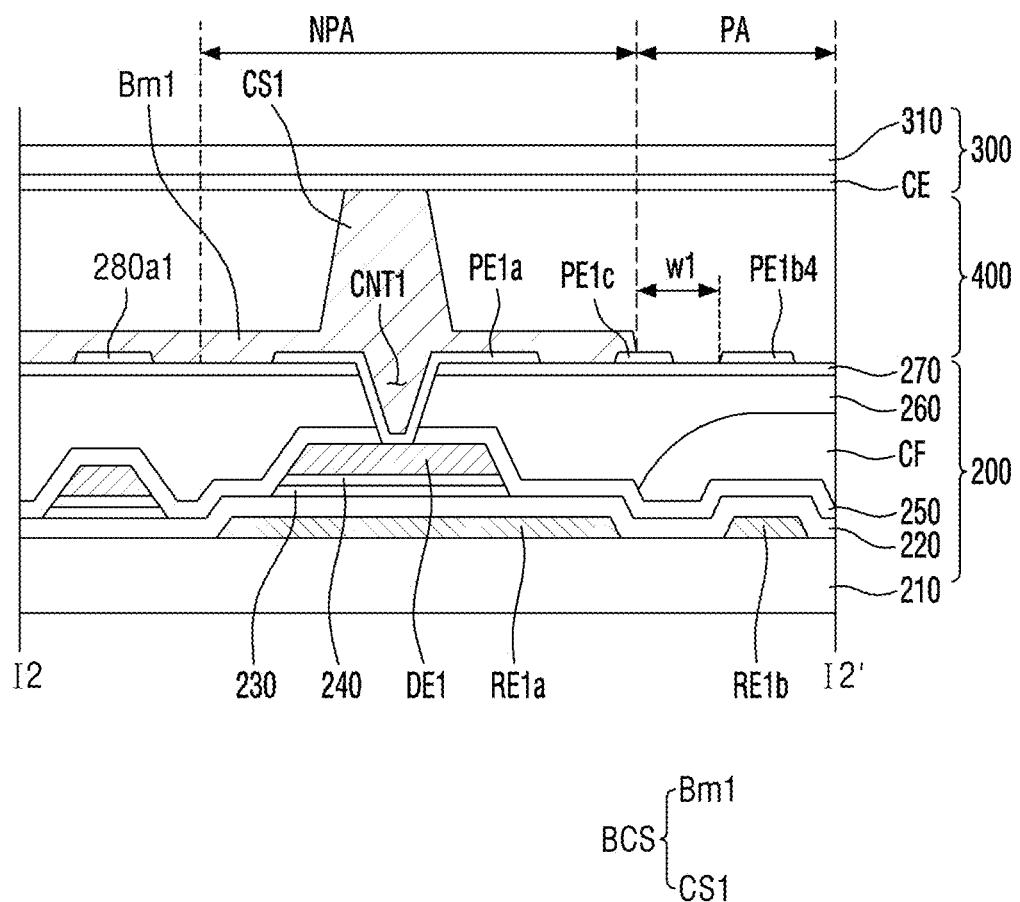
FIG. 5 is a sectional view taken along the line I2-I2' shown in FIG. 3.
Figure 6:
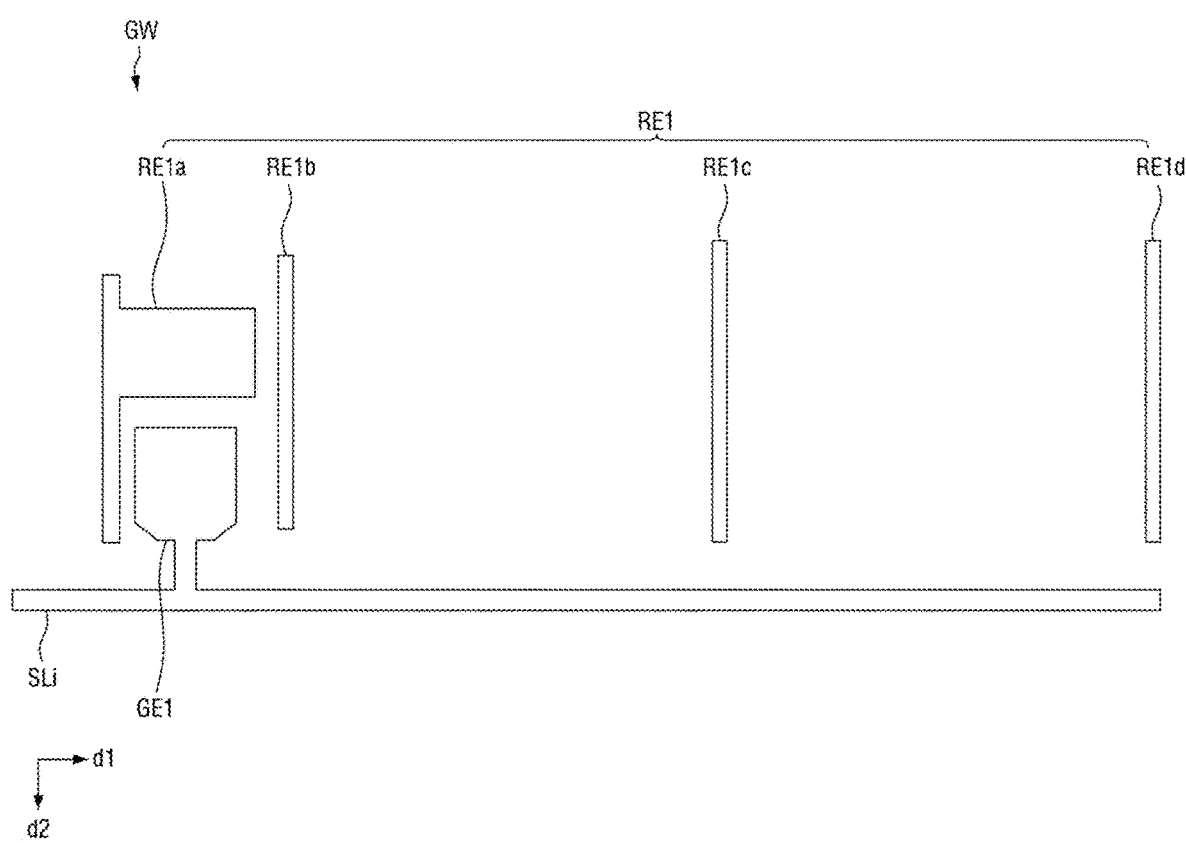
FIG. 6 is a view showing a gate conductor included in the first pixel unit shown in FIG. 3.
Figure 7:
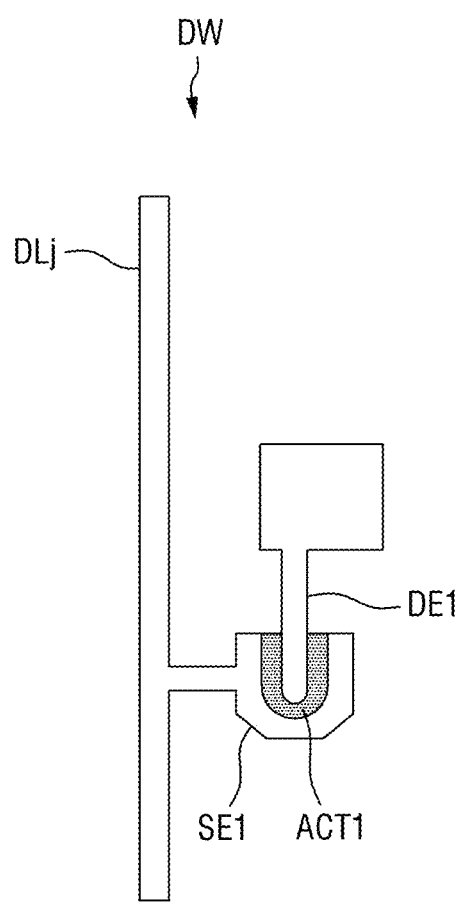
FIG. 7 is a view showing a data conductor included in the first pixel unit shown in FIG. 3.
Figure 8:
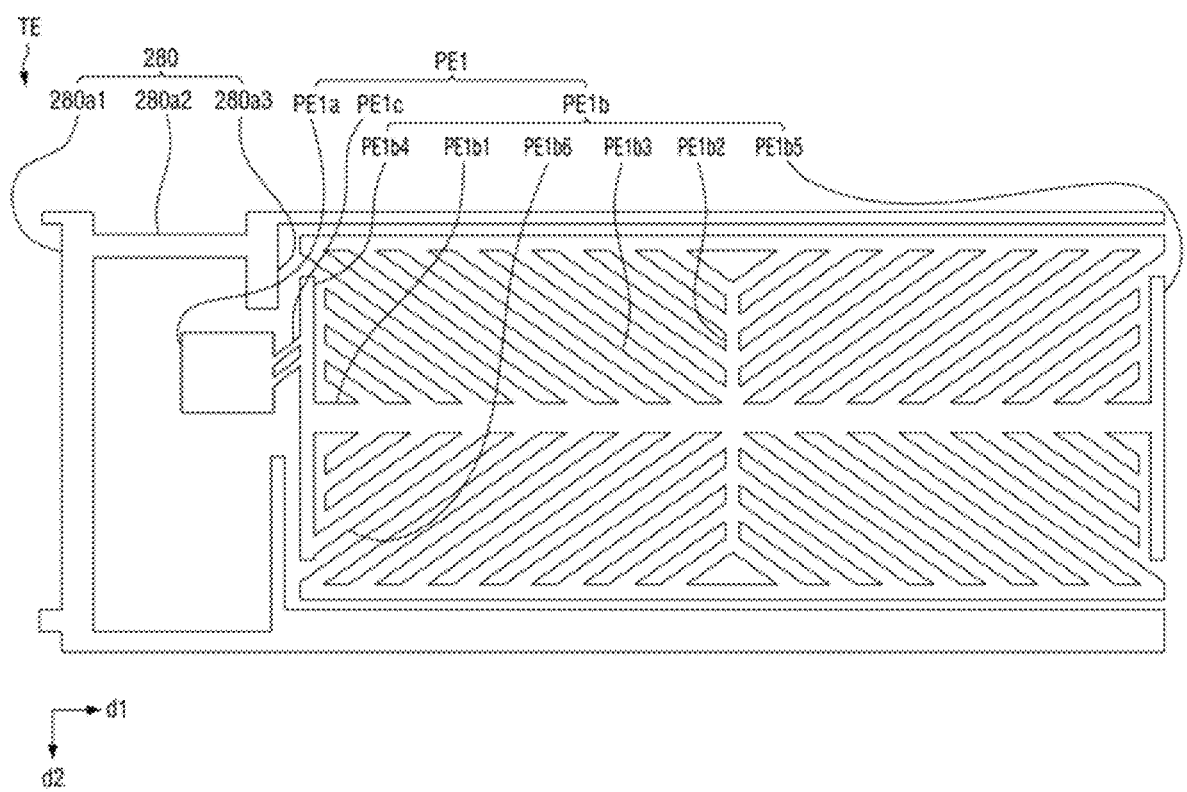
FIG. 8 is a view showing a transparent conductor included in the first pixel unit shown in FIG. 3.
Figure 9:
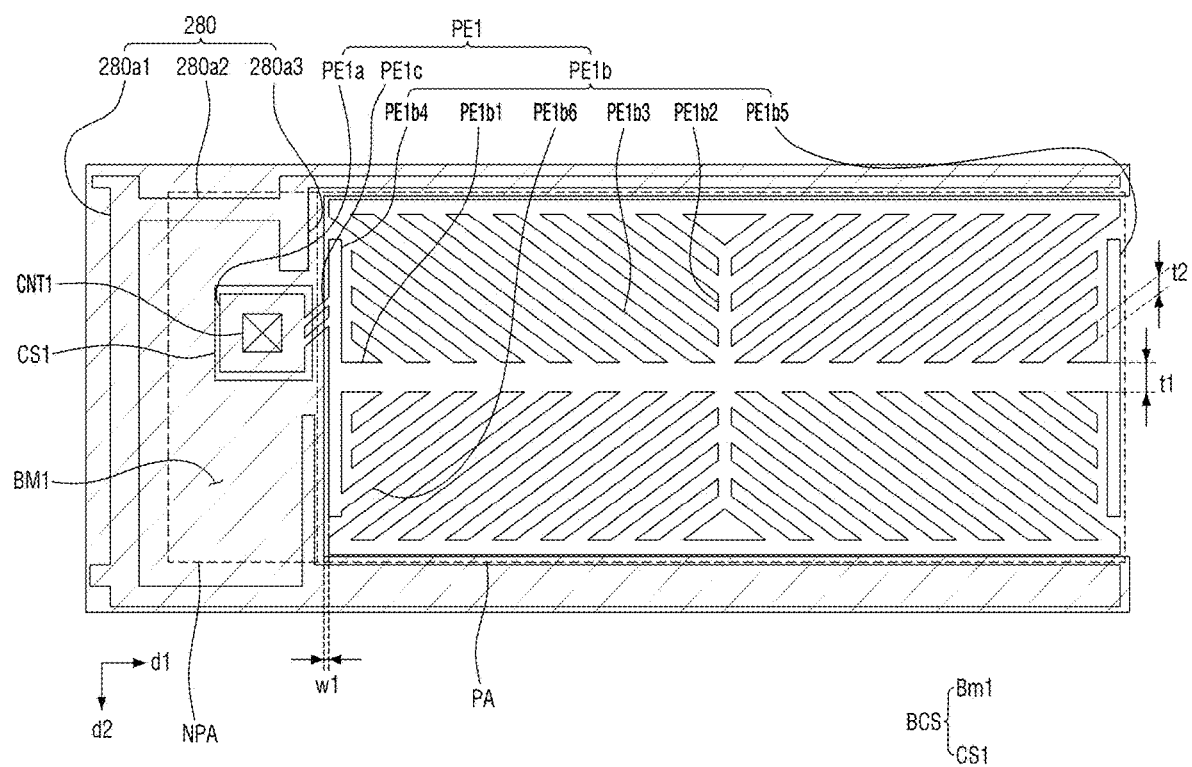
FIG. 9 is a view showing both a black column spacer and a first pixel electrode shown in FIG. 3.

FIG. 4 is a sectional view taken along the line I1-I1' shown in FIG. 3. FIG. 5 is a sectional view taken along the line I2-I2' shown in FIG. 3. FIG. 6 is a view showing a gate conductor GW included in the first pixel unit PX1 shown in FIG. 3. FIG. 7 is a view showing a data conductor DW included in the first pixel unit PX1 shown in FIG. 3. FIG. 8 is a view showing a transparent conductor TE included in the first pixel unit PX1 shown in FIG. 3. FIG. 9 is a view showing both the black column spacer BCS and first pixel electrode PE1 shown in FIG. 3.

A first display panel 200 is disposed to face a second display panel 300. A liquid crystal layer 400 is disposed between the first display panel 200 and the second display panel 300. The liquid crystal layer 400 may include the plurality of liquid crystal molecules 410. In an embodiment, the first display panel 200 may be attached to the second display panel 300 by sealing.

The first display panel 200 will be described.

The first substrate 210 may be a transparent insulation substrate. Here, the transparent insulation substrate may include a glass material, a quartz material, or a light-transmitting plastic material. In an embodiment, the first substrate 210 may have flexibility.

Referring to FIGS. 3 to 6, the gate conductor GW may be disposed on the first substrate 210. The gate conductor GW may include the i-th scan line SLi, the first gate electrode GE1, and a first storage electrode RE1. The first gate electrode GE1 is directly connected with the i-th scan line SLi. The first gate electrode GE1 is disposed in the non-pixel area NPA.

In an embodiment, the first storage electrode RE1 may include first, second, third, and fourth sub-storage electrodes RE1a, RE1b, RE1c and RE1d. The first to fourth sub-storage electrodes RE1a, RE1b, RE1c and RE1d may extend substantially along the second direction d2.

In an embodiment, the first storage electrode RE1 may be in a floating state. The first storage electrode RE1 may overlap at least a part of the first pixel electrode PE1. Thus, it is possible to improve a texture phenomenon that may occur in the first pixel unit PX1. The shape and position of the first storage electrode RE1 are not limited to those shown in FIGS. 3 and 6. The first storage electrode RE1 may also be omitted.

The gate conductor GW may be formed of a single film containing any one conductive metal selected from aluminum (Al), copper (Cu), molybdenum (Mo), chromium (Cr), titanium (Ti), tungsten (W), molybdenum tungsten (MoW), molybdenum titanium (MoTi), and copper/molybdenum titanium (Cu/MoTi), a double film containing two conductive metals, or a triple film containing three conductive metals. The gate conductor GW, that is, the i-th scan line SLi, the first gate electrode GE1, and the first storage electrode RE1 may be simultaneously formed through the same mask process.

A gate insulation film 220 may be disposed on the gate conductor GW. In an embodiment, the gate insulation film 220 may contain silicon nitride, silicon oxide, or the like. The gate insulation film 220 may have a multi-layer structure including at least two insulation layers having different physical properties.

Referring to FIGS. 3 to 5 and 7, the data conductor DW may be disposed over the gate insulation film 220. The data conductor DW may include a semiconductor layer 230 having the j-th data line DLj, the first source electrode SE1, the first drain electrode DE1, and a first semiconductor pattern ACT1.

The semiconductor layer 230 may be disposed on the gate insulation film 220. The first semiconductor pattern ACT1 may form a channel region of the first switching element TR1. In an embodiment, the semiconductor layer 230 may contain an oxide semiconductor. When the semiconductor layer 230 contains an oxide semiconductor, the semiconductor layer 230 may be formed of any one selected from the group consisting of IGZO(In—Ga-Zinc-Oxide), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$. In another embodiment, the semiconductor layer 230 may be formed of amorphous silicon, polycrystalline silicon, or the like.

The data conductor DW may further include an ohmic contact layer 240. The ohmic contact layer 240 may be disposed on the semiconductor layer 230. The ohmic contact layer 240 may be made of a material such as n+ hydrogenated amorphous silicon doped with n-type impurity such as phosphorus at a high concentration, or may be made of a silicide. However, the ohmic contact layer 240 may be omitted if the semiconductor layer 230 is formed of an oxide semiconductor. Hereinafter, a case where the data conductor DW includes the ohmic contact layer 240 will be described.

The j-th data line DLj, the first source electrode SE1, and the first drain electrode DE1 may be disposed on the gate insulation film 220 and the ohmic contact layer 240. The first source electrode SE1 may be branched from the j-th data line DLj, and at least a part thereof may overlap the first gate electrode GE1. The first drain electrode DE1 may overlap the first gate electrode GE1, and may be spaced apart from the first source electrode SE1 by a predetermined distance. Although it is shown in FIGS. 3 and 7 that the first source electrode SE1 has a U-shape and the first drain electrode DE1 is surrounded by the first source electrode SE1, the embodiments are not limited thereto. The first source electrode SE1, the first drain electrode DE1, the first semiconductor pattern ACT1 and the first gate electrode GE1 may form the aforementioned first switching element TR1.

The data conductor DW may be formed of a single film containing any one conductive metal selected from aluminum (Al), copper (Cu), molybdenum (Mo), chromium (Cr), titanium (Ti), tungsten (W), molybdenum tungsten (MoW), molybdenum titanium (MoTi), and copper/molybdenum titanium (Cu/MoTi), a double film containing two conductive metals, or a triple film containing three conductive metals. However, the embodiments are not limited thereto, and the data conductor DW may be made of various metals or conductors. The data conductor DW may be simultaneously formed through the same mask process.

A first passivation film 250 may be disposed on the data conductor DW. The first passivation film 250 includes an opening extending to and exposing at least a part of the first drain electrode DE1. In an embodiment, the first passivation film 250 may be formed of an inorganic insulating material such as silicon nitride or silicon oxide. The first passivation film 250 can prevent the pigment of an organic insulation film 260, which will be described later, from flowing into the first semiconductor pattern ACT1.

A color filter CF may be disposed on the first passivation film 250. Light having passed through the color filter CF may express one of primary colors such as red, green and blue. However, the embodiments are not limited to the primary colors, and any one of cyan, magenta, yellow, and white colors may be expressed. The color filter CF may be formed of a material that expresses different colors for each adjacent pixel unit. The color filter CF may be disposed over the second display panel 300, unlike that shown in FIG. 4.

The organic insulation film 260 may be disposed on the first passivation film 250 and the color filter CF. The organic insulation film 260 overlaps the opening of the first passivation film 250, and includes an opening extending to and exposing at least a part of the first drain electrode DEL The organic insulation film 260 may contain an organic material having excellent planarization characteristics and photosensitivity. The organic insulation film 260 may be omitted.

A second passivation film 270 may be disposed on the organic insulation film 260. In an embodiment, the second passivation film 270 may be formed of an inorganic insulating material such as silicon nitride or silicon oxide. The second passivation film 270 may be omitted.

Referring to FIGS. 3 to 5 and 8, the transparent conductor TE may be disposed on the second passivation film 270. The transparent conductor TE may contain a transparent conductive material. Here, the transparent conductive material may include polycrystalline, monocrystalline or amorphous indium tin oxide (ITO). The transparent conductive material will be described later.

The transparent conductor TE may include the first pixel electrode PE1 and a shielding electrode 280. In an embodiment, the first pixel electrode PE1 may be formed simultaneously with the shielding electrode 280 by the same mask process. The first pixel electrode PE1 and the shielding electrode 280 are disposed on the same layer, but are physically and electrically insulated from each other.

The shielding electrode 280 may include a first sub-shielding electrode 280a1, a second sub-shielding electrode 280a2, and a third sub-shielding electrode 280a3.

The first sub-shielding electrode 280a1 may extend substantially in the second direction d2, and at least a part of the first sub-shielding electrode 280a1 may overlap the j-th data line DLj. The first sub-shielding electrode 280a1 can prevent light leakage from occurring in an area overlapping the j-th data line DLj. The second sub-shielding electrode 280a2 may extend substantially in the first direction d1, and at least a part of the second sub-shielding electrode 280a2 may overlap the i-th scan line SLi and i−1-th scan line (not shown in the drawing). The second sub-shielding electrode 280a2 can prevent light leakage from occurring in an area overlapping the i-th scan line SLi and i−1-th scan line. The third sub-shielding electrode 280a3 may extend from the second sub-shielding electrode 280a2 in the second direction d2a or a direction opposite to the second direction d2. The third sub-shielding electrode 280a3 is disposed to face the first edge PE1b4 of the first pixel electrode PE1, thereby controlling the alignment angle of the plurality of liquid crystal molecules 410 disposed between the third sub-shielding electrode 280a3 and the first edge PE1b4.

In an embodiment, the shielding electrode 280 may be provided with a common voltage supplied to the common electrode CE to be described later, or may be provided with a voltage having the same voltage level. When a voltage having the same voltage level is provided to the shielding electrode 280 and the common electrode CE, no electric field is formed between the shielding electrode 280 and the common electrode CE. Therefore, the plurality of liquid crystal molecules 410 disposed between the shielding electrode 280 and the common electrode CE do not rotate or tilt. Thus, it is possible to prevent light from being transmitted to an area between the shielding electrode 280 and the common electrode CE.

Referring to 3 to 5 and 9, the first column spacer CS1 and the black matrix BM1 may be disposed on the transparent conductor TE. However, contents of the first column spacer CS1 and the black matrix BM1, overlapping the aforementioned contents, will be omitted.

As described above, the first column spacer CS1 may overlap the first contact hole CNT1. Accordingly, it is possible to reduce the reflection phenomenon due to external light that may occur in the first contact hole CNT1 and to reduce texture defects and oblique stains. Moreover, since the first column spacer CS1 and the black matrix BM1 are formed through the same mask process, the number of masks can be reduced as compared with a case where the first column spacer CS1 and the black matrix BM1 are formed through separate mask processes.

The first column spacer CS1 does not overlap the pixel area PA. That is, the first column spacer CS1 does not overlap the first body portion PE1b disposed in the pixel area PA. This may also be expressed by the fact that the first column spacer CS1 and the first body portion PE1b are spaced from each other at a plan view.

More specifically, the first column spacer CS1 may be spaced apart from the first edge PE1b4 of the first body portion PE1b by a first distance w1. Here, in an embodiment, the first distance w1 may be 2 um or more. Since the first column spacer CS1 is spaced apart from the first edge PE1b4 by the first distance w1, the first column spacer CS1 does not overlap the first stem PE1b1 of the first body portion PE1b.

Meanwhile, since the first column spacer CS1 and the first stem PE1b1 do not overlap each other, it is possible to prevent cracks that may occur in the first stem PE1b1 due to a difference in thermal expansion coefficient between the materials of the first column spacer CS1 and the first stem PE1b1.

The thickness t1, in the second direction d2, sometimes also called the width t1, of the first stem PE1b1 of the first pixel electrode PE1 may have a value sufficient to prevent the aforementioned cracks from occurring in the first stem PE1b1. In an embodiment, the thickness t1 of the first stem PE1b1 may be 5 m or more. The first distance w1 and the thickness t1 of the first stem PE1b1 will be described later.

Although not shown in the drawings, a first alignment film may be disposed on the first column spacer CS1 and the black matrix BM1. The first alignment film can induce the initial alignment of the plurality of liquid crystal molecules 410 in the liquid crystal layer 400. In an embodiment, the first alignment film may include an organic polymer material having an imide group in the repeating unit of the main chain thereof.

Next, the second display panel 300 will be described.

The second substrate 310 is disposed to face the first substrate 210. The second substrate 310 may be formed of transparent glass, plastic, or the like, and, in an embodiment, may be formed of the same material as the first substrate 210.

The common electrode CE may be disposed on the second substrate 310. At least a part of the common electrode CE may overlap the first pixel electrode PE1. In an embodiment, the common electrode CE may be formed in the shape of a plate. However, the embodiments are not limited thereto, and the common electrode CE may have a plurality of slits. In an embodiment, the common electrode CE may be made of a transparent conductive material such as ITO or IZO, or may be made of a reflective metal such as aluminum, silver, chromium, or an alloy thereof.

Although not shown in the drawings, a second alignment film may be disposed on the common electrode CE. The second alignment film can induce the initial alignment of the plurality of liquid crystal molecules 410 in the liquid crystal layer 400. In an embodiment, the second alignment film may be made of the same material as the first alignment film.

Subsequently, the liquid crystal layer 400 will be described.

The liquid crystal layer 400 includes the plurality of liquid crystal molecules 410. In an embodiment, the plurality of liquid crystal molecules 410 may be vertically aligned in an initial alignment state with negative dielectric anisotropy. The plurality of liquid crystal molecules 410 may have a predetermined pretilt angle in the initial alignment state. The initial alignment of the plurality of liquid crystal molecules 410 may be induced by the aforementioned first and second alignment films. When an electric field is formed between the first display panel 200 and the second display panel 300, the plurality of liquid crystal molecules 410 can change the polarization state of light transmitted to the liquid crystal layer 400 by tilting or rotating in a specific direction.

Next, the material of the first pixel electrode PE1 and the relationship between the first column spacer CS1 and the first pixel electrode PE1 will be described in more detail.

The first pixel electrode PE1 may be formed of ITO. More specifically, the first pixel electrode PE1 may be formed of amorphous, monocrystalline, and polycrystalline ITO. Here, the refractive index of ITO is lower than that of IZO. Therefore, when the first pixel electrode PE1 is formed of ITO, a contrast ratio can be improved and a reflectance due to external light can be reduced compared to when the first pixel electrode PE1 is formed of IZO. The contrast ratio and the reflectance will be described in more detail with reference to FIGS. 10A, 10B and 11A, 11B.

Figure 10A:
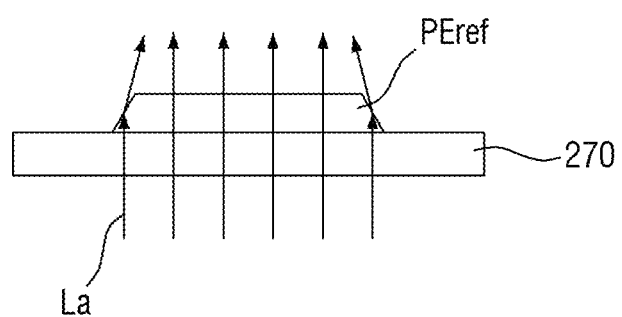
FIGS. 10A and 10B are views for explaining the improvement in contrast ratio according to an embodiment.
Figure 10B:
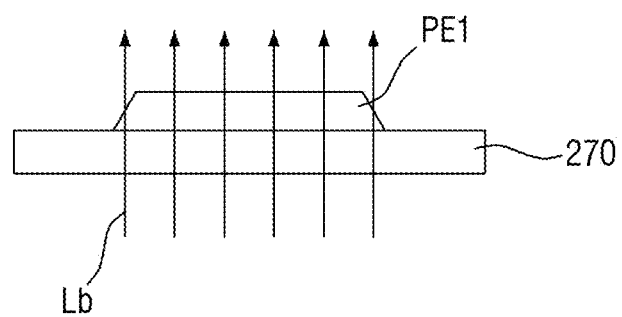
Figure 11A:
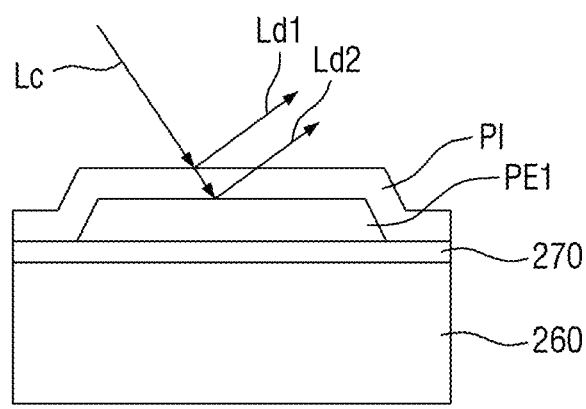
FIGS. 11A and 11B are views for explaining the reduction in reflectance according to an embodiment.
Figure 11B:
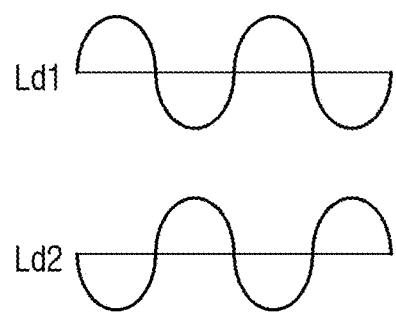

FIGS. 10A and 10B are views for explaining the improvement in contrast ratio according to an embodiment. FIGS. 11A and 11B are views for explaining the reduction in reflectance according to an embodiment.

First, the improvement of the contrast ratio will be described with reference to FIGS. 10A and 10B.

FIG. 10A is a view showing an expected path of transmitted light in the comparative pixel electrode PEref according to a comparative example in accordance with one embodiment. FIG. 10B is a view showing an expected path of transmitted light in the first pixel electrode PE1 according to one embodiment. However, for more accurate comparison, it is assumed that both the comparative pixel electrode PEref and the first pixel electrode PE1 are disposed on the second passivation film 270, and the refractive index of the second passivation film 270 is about 1.84.

Referring to FIG. 10A, the comparative pixel electrode PEref may be formed of IZO. Here, IZO may have a refractive index of about 2.05. A part of first transmitted light La may be refracted at a predetermined angle while transmitting the comparative pixel electrode PEref due to a difference in refractive index between IZO and the second passivation film 270. More specifically, light transmitted through both sides of the comparative pixel electrode PEref in the first transmitted light La may be refracted at a predetermined angle. The contrast ratio is lowered by the refracted light.

Referring to FIG. 10B, the first pixel electrode PE1 may be formed of ITO. Here, ITO may have a refractive index of about 1.85. That is, the refractive index of ITO may be substantially equal to the refractive index of the second passivation film 270. Accordingly, second transmitted light Lb may not be refracted even though it transmits the first pixel electrode PE1. That is, the second transmitted light Lb may be emitted in a direction perpendicular to the second passivation film 270. Therefore, the contrast ratio in the case of FIG. 10B is higher than that in the case of FIG. 10A.

Subsequently, the reduction of reflectance will be described with reference to FIGS. 11A and 11B.

First, the reflectance of the first pixel electrode PE1 is defined. The reflectance of the first pixel electrode PE1 refers to a ratio of the amount of light reflected by the first pixel electrode PE1 and provided back to the outside when the amount of light incident from the outside (hereinafter, external light) is 100. The reflectance of the first pixel electrode PE1 can be adjusted according to the thickness of the first pixel electrode PE1 and the refractive index of the first pixel electrode PE1. However, in this specification, details will be described based on the refractive index of the first pixel electrode PE1.

Meanwhile, the refractive index of the first pixel electrode PE1 is about 1.85, and the refractive index of a first alignment film PI disposed on the first pixel electrode PE1 is about 1.48. Further, it is assumed that the refractive index of the second passivation film 270 disposed under the first pixel electrode PE1 is about 1.85, and the refractive index of the organic insulation film 260 is about 1.56. Since the refractive indices of the first pixel electrode PE1 and the second passivation film 270 are substantially equal to each other, the refractive index of the second passivation film 270 may be neglected.

Referring to FIG. 11A, external light Lc incident from the outside may be partially reflected at the interface of the first alignment film PI due to the difference between the refractive index of the first alignment film PI and the external refractive index. Hereinafter, the light reflected at the interface of the first alignment film PI is referred to as first reflected light Ld1.

Further, the light having passed through the first alignment film PI may be partially reflected at the interface of the first pixel electrode PE1 due to the difference in refractive index between the first alignment film PI and the first pixel electrode PE1. Hereinafter, the light reflected at the interface of the first pixel electrode PE1 is referred to as second reflected light Ld2.

Referring to FIG. 11B, the first reflected light Ld1 and the second reflected light Ld2 may have different phases from each other. More specifically, the phases of the first reflected light Ld1 and the second reflected light Ld2 may be symmetrical to each other, that is, may have a phase difference of 180 degrees. Accordingly, when the first reflected light Ld1 and the second reflected light Ld2 are recombined again, the amplitude of the recombined first reflected light Ld1 and reflected second light Ld2 can be reduced as the first reflected light Ld1 and reflected second light Ld2 extinguishes and interferes by a phase difference therebetween. This means that the reflectance of the first pixel electrode PE1 can be reduced. The degree of amplitude reduction may increase as the refractive index difference of each layer decreases. Further, the degree of amplitude reduction may increase when a plurality of layers having different refractive indices are laminated to form a multilayer structure.

Accordingly, the first pixel electrode PE1 is formed to have a multilayer structure of the first alignment layer PI and the organic insulation layer 260 having different refractive indexes, and the difference in refractive index between the first alignment layer PI and the organic insulation film 260 is small. Therefore, the reflectance of the first pixel electrode PE1 due to external light can be reduced.

Meanwhile, ITO and IZO are different from each other in the amount of stress change due to heat treatment under an amorphous state. More specifically, amorphous IZO has a relatively small amount of stress change due to heat treatment. This means that amorphous IZO can maintain an amorphous state even after heat treatment. In contrast, amorphous ITO has a relatively large amount of stress change due to heat treatment. That is, amorphous ITO may undergo a phase change into monocrystalline or polycrystalline ITO after heat treatment.

This will be described in more detail with reference again to FIG. 9.

In an embodiment, the heat treatment may be performed during the process of forming the first column spacer CS1. Meanwhile, as described above, the first column spacer CS1 is formed simultaneously with the black matrix BM1. Hereinafter, details will be described based on a black column spacer BCS.

As described above, the black column spacer BCS includes a first column spacer CS1 overlapping the first contact hole CNT1. Further, the first contact portion PE1a of the first pixel electrode PE1 is disposed to overlap the first contact hole CNT1. Accordingly, as the first contact portion PE1a overlaps the first column spacer CS1, the first pixel electrode PE1 may be cracked due to the heat treatment performed during the process of forming the black column spacer BCS. The crack may occur at a relatively thin portion of the first pixel electrode PE1, for example, the crack may occur at the first stem PE1b1.

When the crack occurs at the first stem PE1b1, the first body portion PE1b and the first connection portion PE1c may not be electrically connected to each other. In this case, an image may not be displayed in an area where the first pixel unit PX1 is disposed.

The liquid crystal display device according to an embodiment may include at least one of the following three configurations in order to prevent an image from not being displayed due to the occurrence of cracks.

First, in the liquid crystal display device according to an embodiment, the first body portion PE1b of the first pixel electrode PE1 may not overlap the black column spacer BCS. In other words, the black column spacer BCS may be formed to have a first distance w1 with the first body portion PE1b of the first pixel electrode PE1 on a plane. More specifically, the black column spacer BCS may be formed to have a first distance w1 with the first edge PE1b4 of the first body portion PE1b. Meanwhile, although it is shown in FIG. 9 that, in the aforementioned black column spacer BCS, the black matrix BM1 and the first edge PE1b4 are disposed to have the first space w1 therebetween, the embodiments are not limited thereto. That is, when the first column spacer CS1 is formed closer to the first edge PE1b4 than the black matrix BM1, the first column spacer CS1 and the first edge PE1b4 may be disposed to have the first distance w1 therebetween.

This will be described in more detail with reference to FIGS. 12 and 13.

Figure 12:
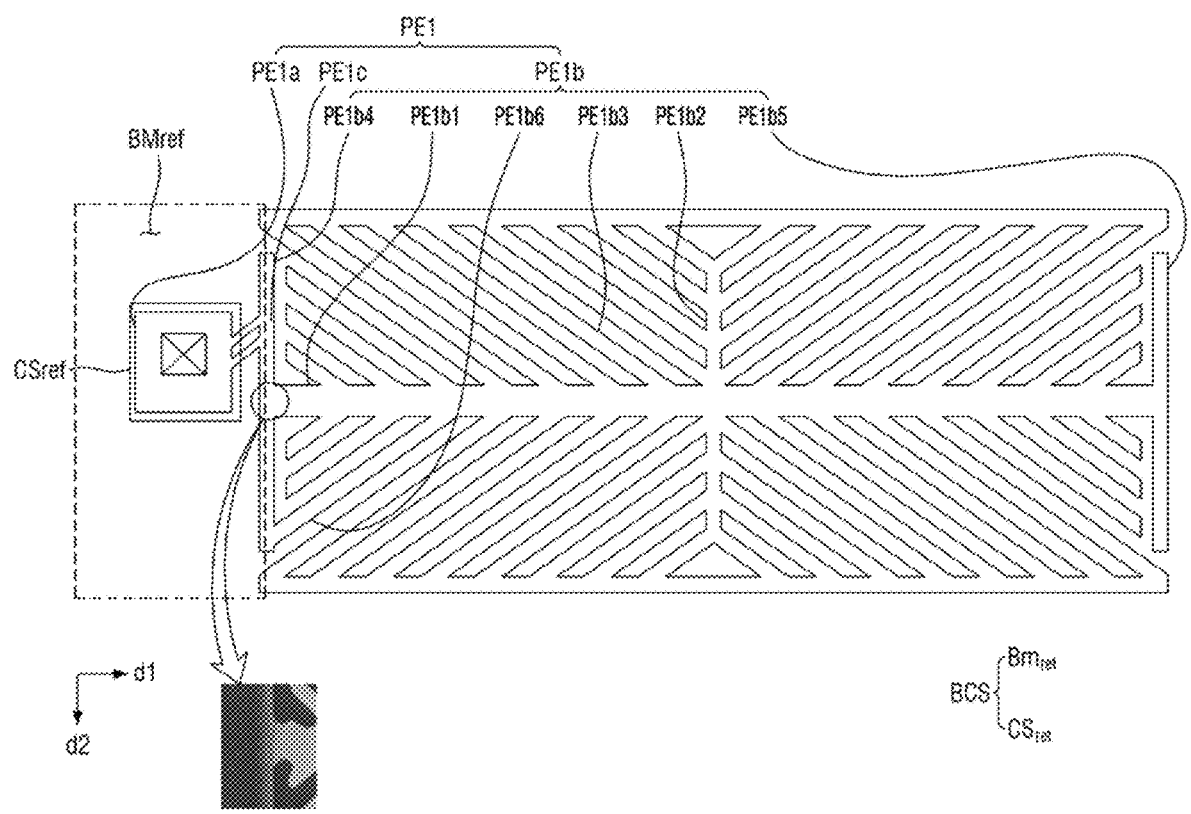
FIG. 12 is a view showing the occurrence of cracks in a liquid crystal display device according to a comparative example.

FIG. 12 is a view showing the occurrence of cracks in a liquid crystal display device according to a comparative example in accordance with one embodiment. FIG. 13 is a view showing the non-occurrence of cracks in the liquid crystal display device according to an embodiment. For the convenience of explanation, the components shown in FIGS. 12 and 13 will be denoted by the same reference numerals.

In FIG. 12, in the comparative column spacer CSref and comparative black matrix BMref included in the black column spacer BCS, the comparative black matrix BMref overlaps the first edge PE1b4. Thus, it can be seen that cracks occur in the first stem PE1b1 shown in FIG. 12.

Figure 13:
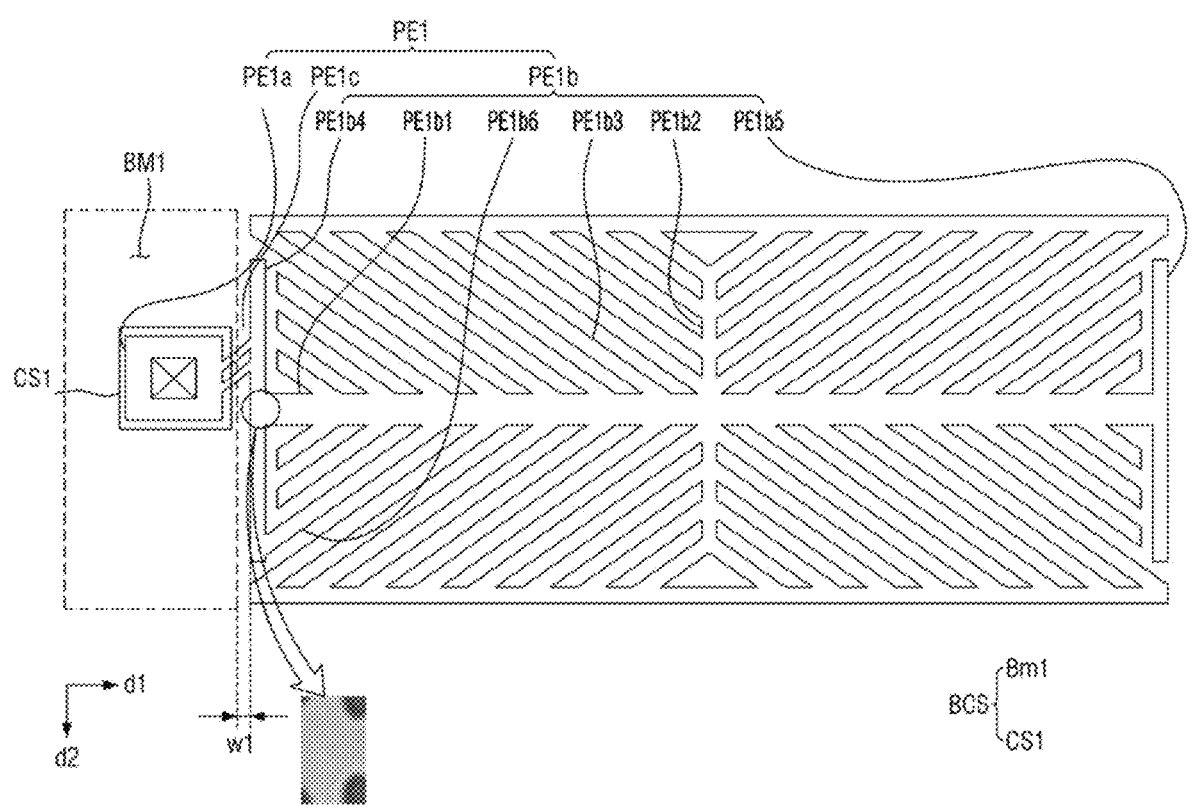
FIG. 13 is a view showing the non-occurrence of cracks in the liquid crystal display device according to an embodiment.

In contrast, in FIG. 13, the black matrix BM1 is disposed to have a first distance w1 from the first edge PE1b4. That is, the black matrix BM1 does not overlap the first edge PE1b4. Therefore, it can be seen that cracks occur in the first stem PE1b1 shown in FIG. 12 and not in FIG. 13. That is, in the liquid crystal display device according to an embodiment, the black column spacer BCS and the first edge PE1b4 are formed to have a first distance w1 therebetween, thereby preventing the occurrence of cracks in the first stem PE1b. As described above, the first distance w1 may be about 2 um or more.

Next, referring to FIG. 9, the thickness t1 of the first stem PE1b1 may be thicker than the thickness t2 of the plurality of first branches PE1b3. That is, the first stem PE1b1 and the plurality of first branches PE1b3 may be formed such that the thickness t1 of the first stem PE1b1 is relatively thicker than the thickness t2 of the plurality of first branches PE1b3. For example, the thickness t1 of the first stem PE1b1 may be about 5 m or more. That is, in the first pixel electrode PE1, the first stem PE1b1 and the first branch PE1b3 are formed such that the thickness t1 of the first stem PE1b1 is thicker than the thickness t2 of the first branch PE1b3 (for example, the first stem PE1b1 is formed to have a thickness of about 5 um or more), thereby preventing the occurrence of cracks in the first stem PE1b1.

Further, the liquid crystal display device according to an embodiment may include the edge branch PE1b6. Referring to FIG. 9, the first pixel electrode PE1 may include the edge branch PE1b6. The edge branch PE1b6 is directly connected to the first edge PE1*b*4. Therefore, it is possible to prevent the first body portion PE1*b* and the first connecting portion PE1*c* from not being electrically connected to each other even if cracks occur in the first stem PE1*b*1.

Next, a liquid crystal display device according to another embodiment will be described.

Figure 14:
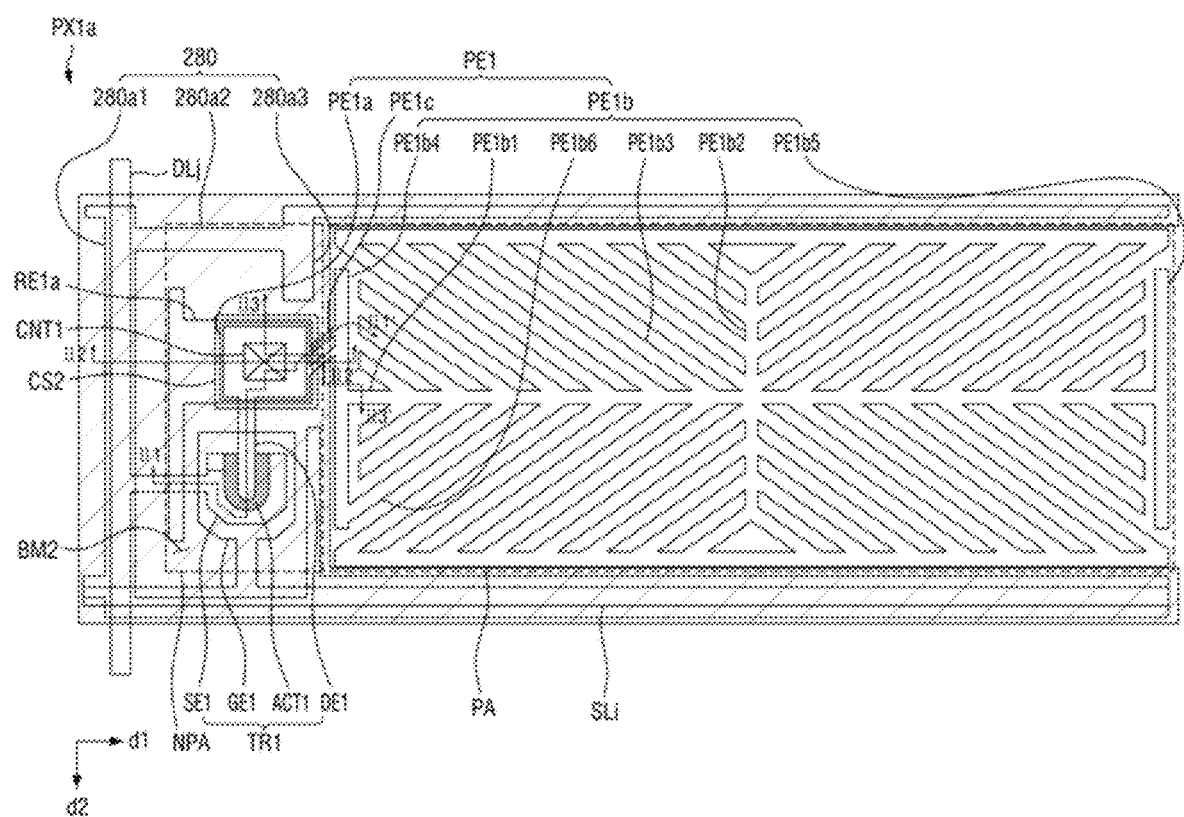
FIG. 14 is a layout view showing a first pixel unit included in a liquid crystal display device according to another embodiment.
Figure 15:
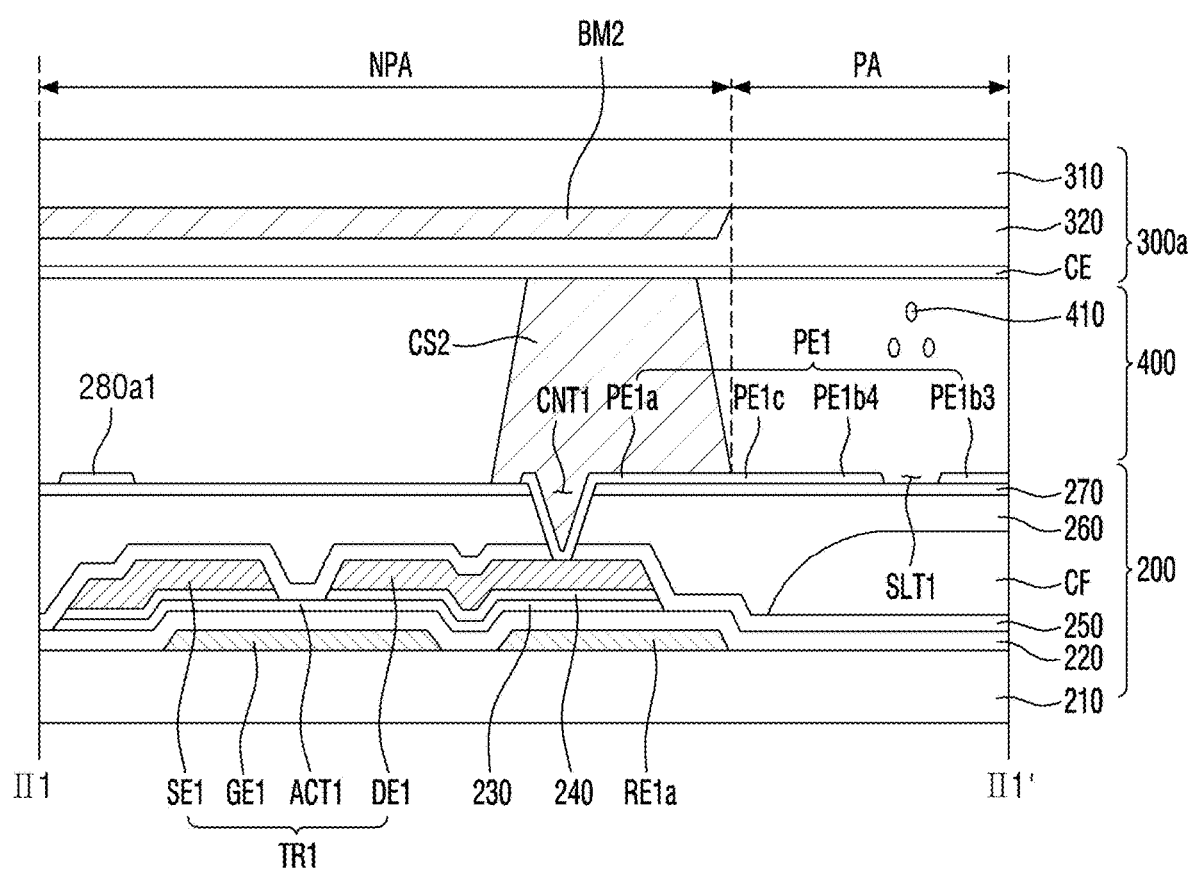
FIG. 15 is a sectional view taken along the line II1-II1' shown in FIG. 14.
Figure 16:
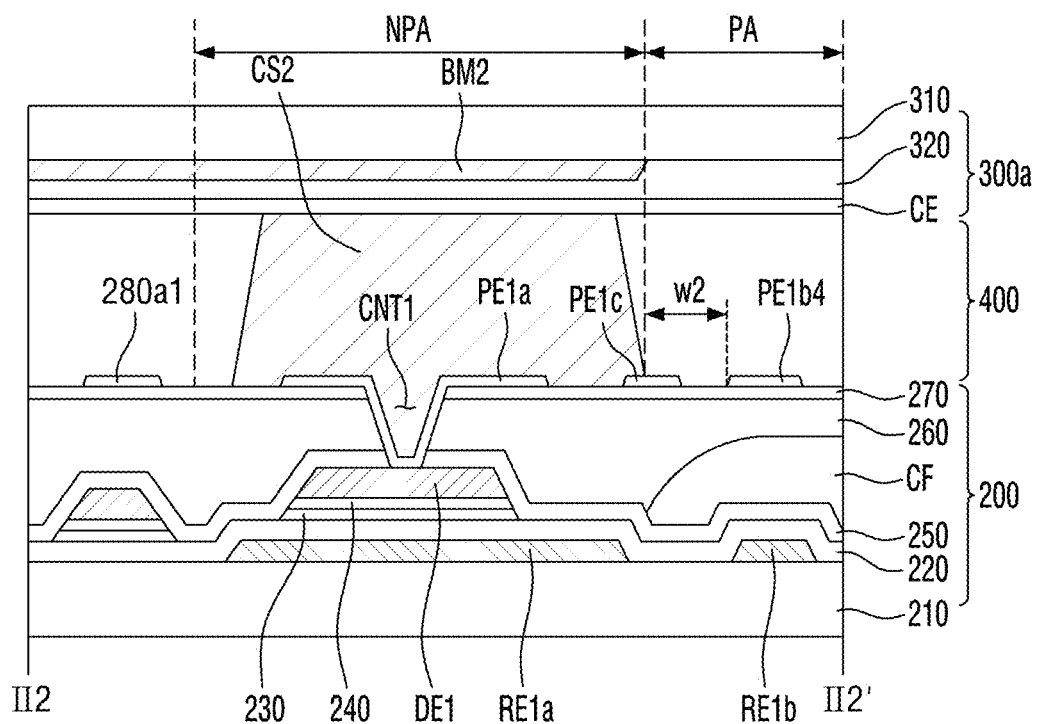
FIG. 16 is a sectional view taken along the line II2-II2' shown in FIG. 14.

FIG. 14 is a layout view showing a first pixel unit PX1 included in a liquid crystal display device according to another embodiment. FIG. 15 is a sectional view taken along the line II1-II1' shown in FIG. 14. FIG. 16 is a sectional view taken along the line II2-II2' shown in FIG. 14. However, contents overlapping those having been described with reference to FIGS. 1 to 13 will not be described again.

The liquid crystal display device shown in FIGS. 14 to 16 is different from the liquid crystal display device shown in FIG. 3 in that a black matrix BM2 is disposed in a second display panel 300*a*. Accordingly, a second column spacer CS2 is independently formed through a separate process from the black matrix BM2. Meanwhile, the second display panel 300*a* may further include an overcoat layer 320.

The black matrix BM2 may be disposed on a second substrate 310. The overcoat layer 320 may be disposed on the black matrix BM2. The material of the overcoat layer 320 is not particularly limited as long as it can provide flatness to the common electrode CE. In an embodiment, the overcoat layer 320 may be formed of an insulating material. The overcoat layer 320 may be omitted in some cases.

The first edge PE1*b*4 of the first pixel electrode PE1 does not overlap the second column spacer CS2. That is, the second column spacer CS2 may also be disposed to have a second distance w2 from the first edge PE1*b*4. That is, the first pixel electrode PE1 shown in FIGS. 14 to 16 may be influenced by the heat treatment process at the time of forming the second column spacer CS2. Accordingly, in the liquid crystal display device according to another embodiment, the second column spacer CS2 and the first edge PE1*b*4 of the first pixel electrode PE1 are disposed to have a second distance w2, thereby preventing the occurrence of cracks in the first stem PE1*b*1.

Figure 17:
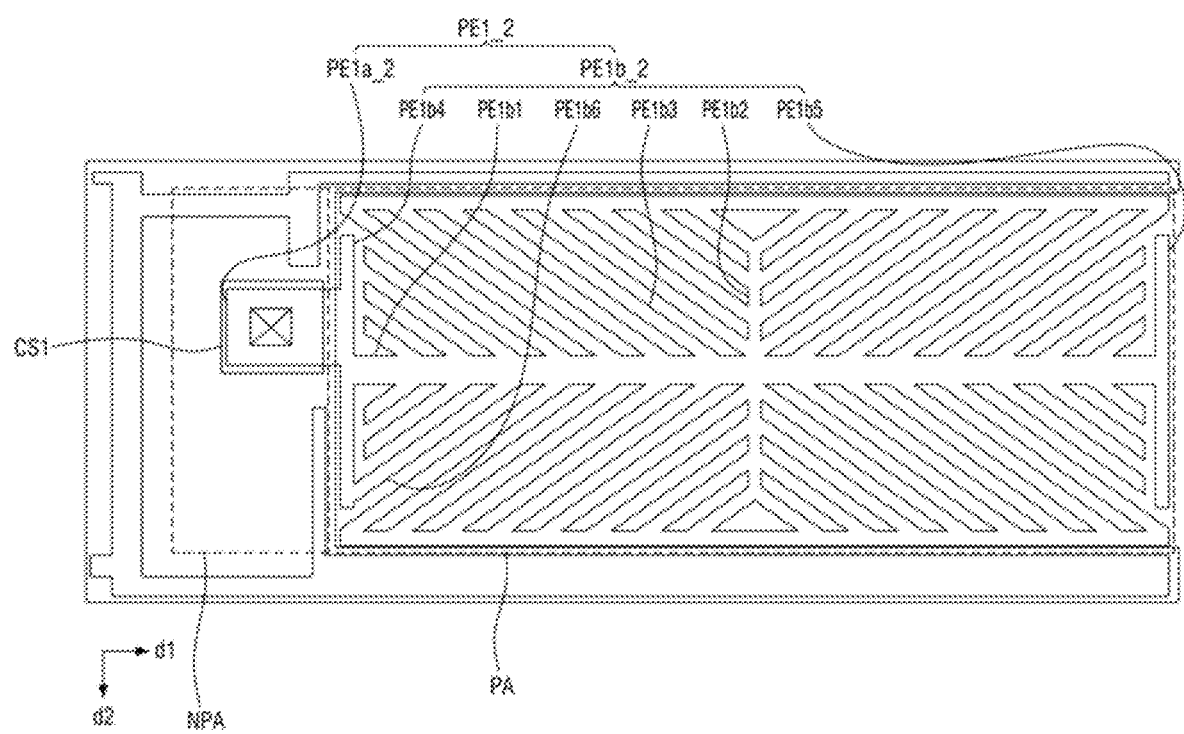
FIG. 17 is a view showing another embodiment of the first pixel electrode shown in FIG. 3.

FIG. 17 is a view showing another embodiment of a first pixel electrode PE1_2 similar to the first pixel electrode PE1 shown in FIG. 3.

Referring to FIG. 17, the first pixel electrode PE1_2 may include a first contact portion PE1*a*_2 and a first body portion PE1*b*_2. Here, the first contact portion PE1*a*_2 may be directly connected to the first body portion PE1*b*_2. That is, the first pixel electrode PE1_2 does not include the first connection portion PE1*c* shown in FIG. 3.

When the first contact portion PE1*a*_2 and the first body portion PE1*b*_2 are directly connected to each other, the first contact portion PE1*a*_2 and the first body portion PE1*b*_2 may have a relatively strong structure against cracks or the like, compared to the first connection portion PE1*c* shown in FIG. 3. Thus, it is possible to prevent the first contact portion PE1*a*_2 and the first body portion PE1*b*_2 from being disconnected or electrically isolated from each other due to cracks or the like.

However, even when the first contact portion PE1*a*_2 and the first body portion PE1*b*_2 are directly connected to each other, the first edge PE1*b*4 does not overlap the first column spacer CS1. Thus, it is possible to prevent the occurrence of cracks in the stem PE1*b*1.

Next, another embodiment of the edge branch PE1*b*6 will be described with reference to FIGS. 18 and 19.

Figure 18:
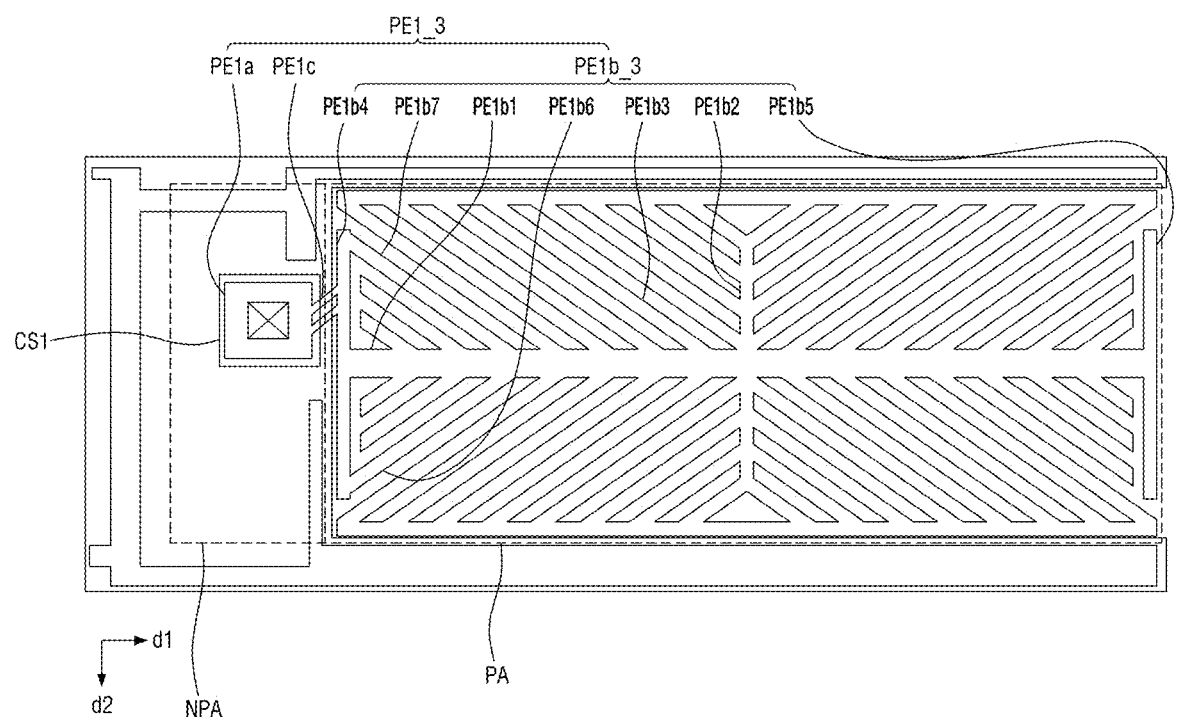
FIGS. 18 and 19 are views showing another embodiment of the edge stem portions shown in FIG. 3.
Figure 19:
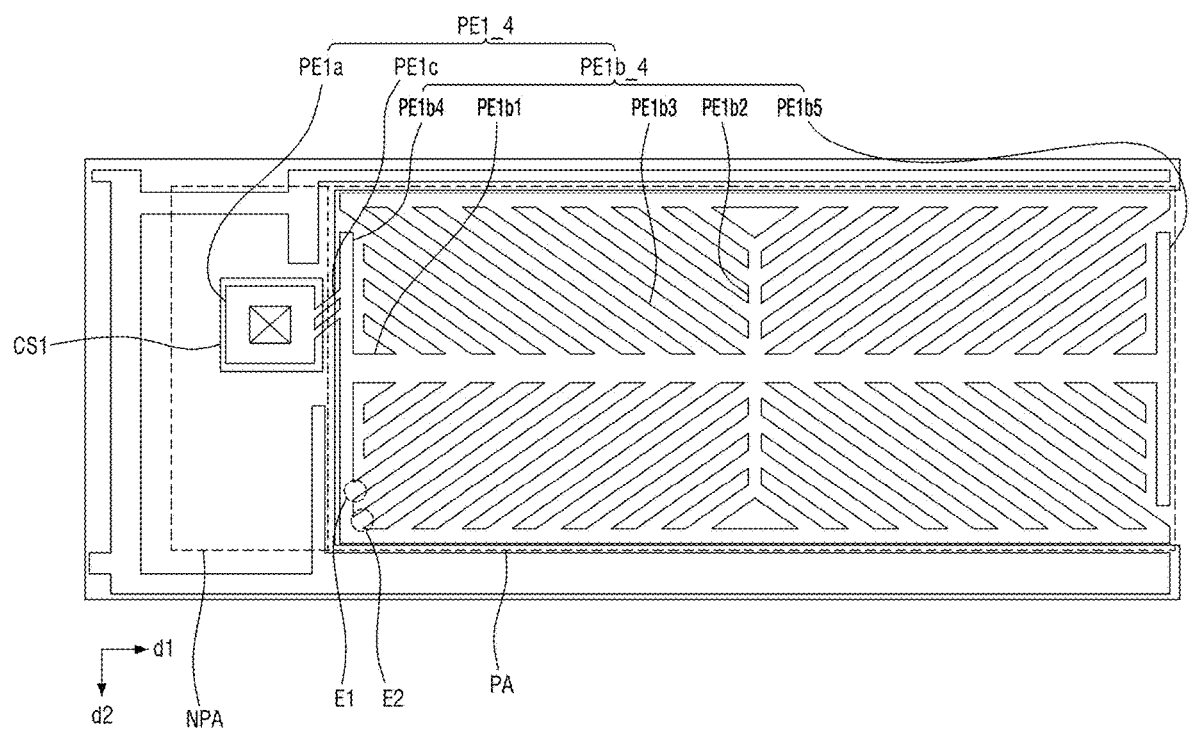

FIGS. 18 and 19 are views showing other embodiments of an edge branch similar to the edge branch PE1*b*6 shown in FIG. 3.

Referring to FIG. 18, a first pixel electrode PE1_3 may include a first body portion PE1*b*_3. The first body portion PE1*b*_3 may include a first edge branch PE1*b*6 and a second edge branch PE1*b*7. That is, even if the first stem PE1*b*1 is insulated from the first edge PE1*b*4 by crack or the like, the electrical connection between the first stem PE1*b*1 and the first edge PE1*b*4 can be maintained by including two edge branches PE1*b*6, PE1*b*7.

Referring to FIG. 19, a first pixel electrode PE1_4 may include a first body portion PE1*b*_4. The first body portion PE1*b*_4 may include a plurality of first stems PE1*b*3 directly connected to the first edge PE1*b*4 in a first region E1 and a second region E2. That is, the plurality of first stem PE1*b*3 may be directly connected to the first edge PE1*b*4 in the outer region of the first body portion PE1*b*_4.

That is, when the edge branch can maintain an electrical connection with the first edge PE1*b*4 even if cracks or the like occur, the positions each where the edge branch is connected to the first edge PE1*b*4 and the number of the positions are not limited to those shown in FIGS. 3, 18, and 19.

Figure 21:
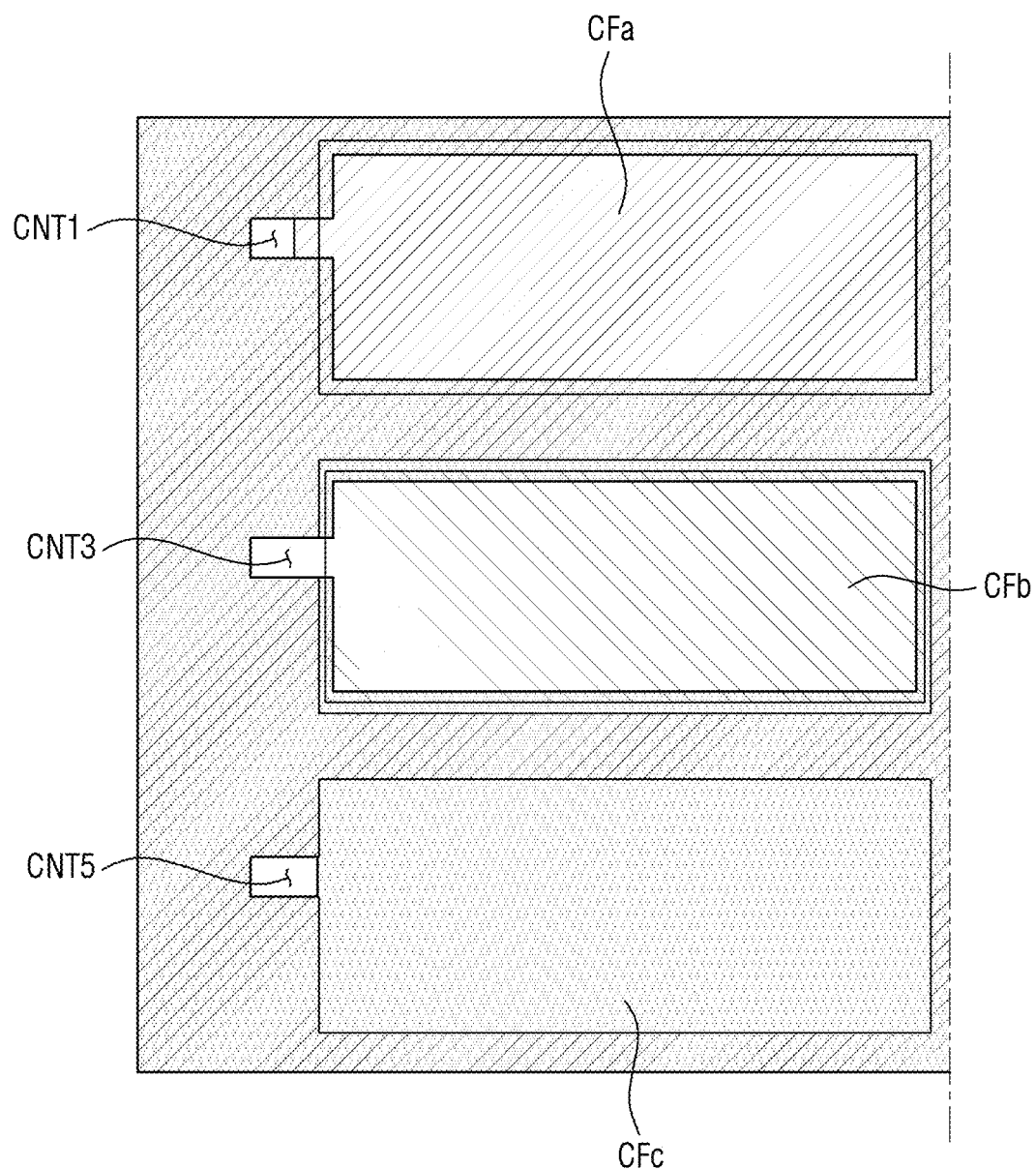
FIG. 21 is a view showing color filters at least partially overlapping a first pixel unit, a third pixel unit, and a fifth pixel unit.
Figure 22:
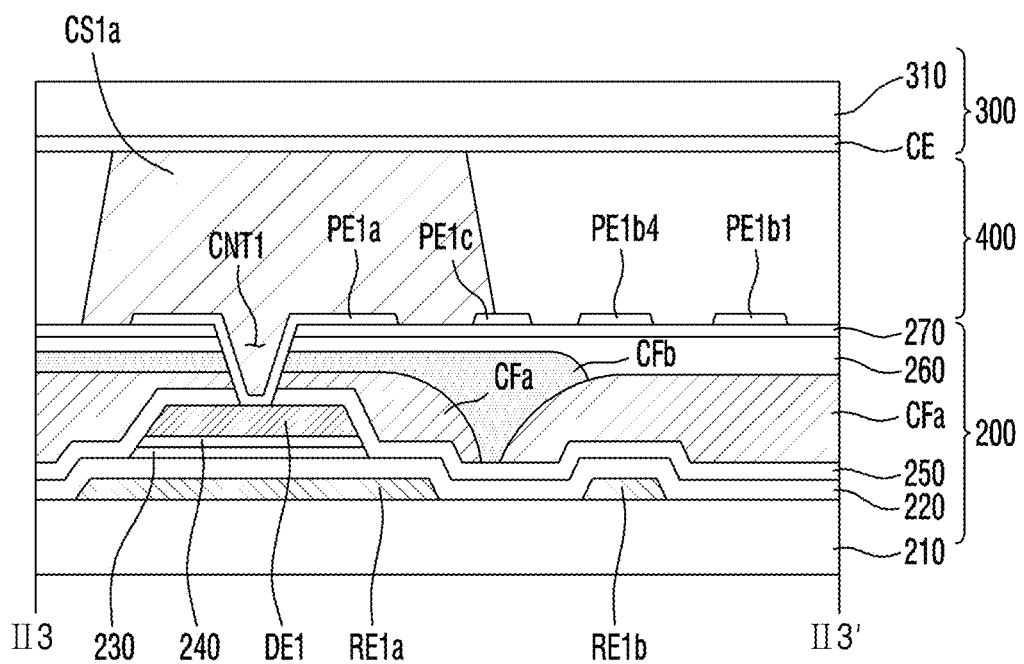
FIG. 22 is a sectional view taken along the line II3-II3' in FIG. 20.

Hereinafter, a liquid crystal display device according to another embodiment will be described with reference to FIGS. 20 to 22. For the convenience of explanation, components overlapping those shown in FIGS. 2 and 3 will be denoted by the same reference numerals. Further, contents overlapping those having been described with reference to FIGS. 1 to 10 will not be described.

Figure 20:
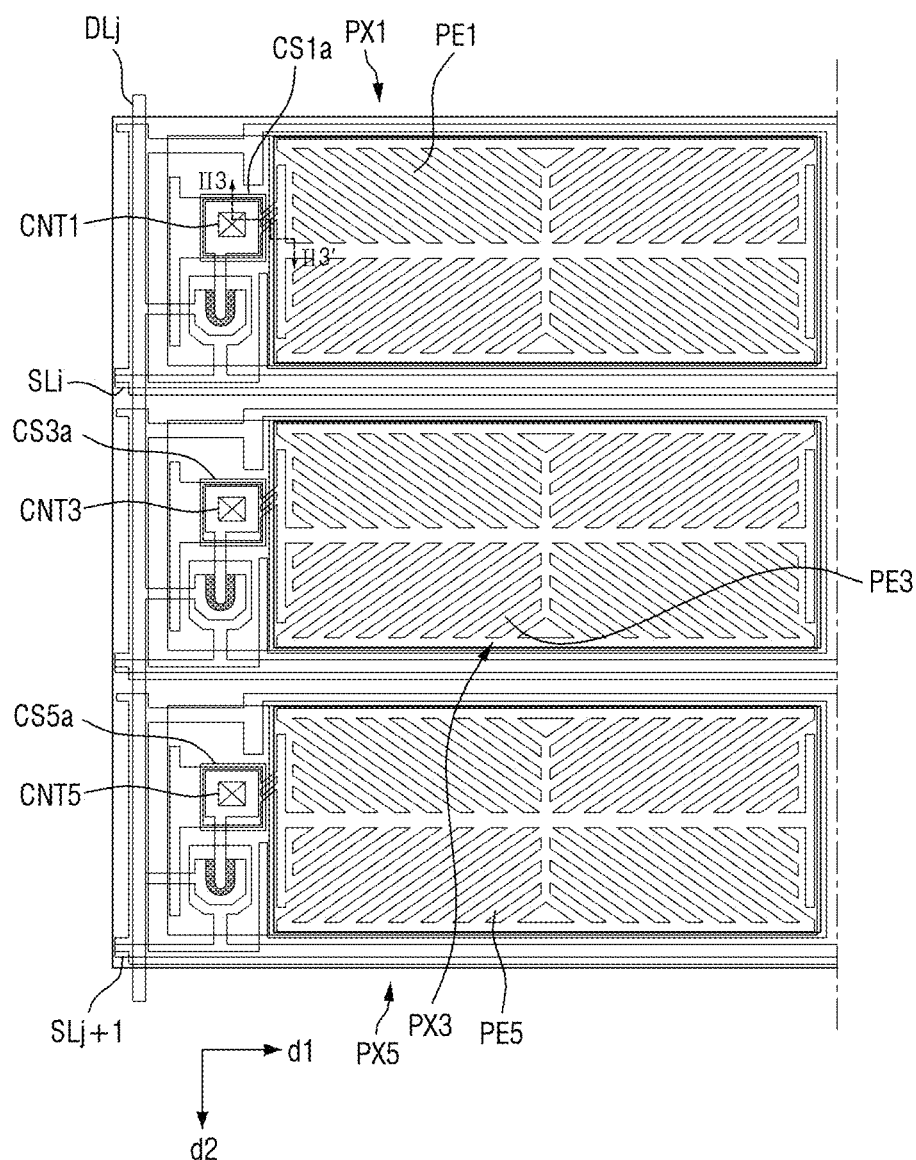
FIG. 20 is a sectional view showing a liquid crystal display device according to another embodiment.

FIG. 20 is a layout view showing a first pixel unit PX1, a third pixel unit PX3, and a fifth pixel unit PX5 in the structure of a liquid crystal display device according to another embodiment. FIG. 21 is a view showing color filters CFa, CFb, and CFc at least partially overlapping the first pixel unit PX1, the third pixel unit PX3, and the fifth pixel unit PX5. FIG. 22 is a sectional view taken along the line II3-II3' in FIG. 20. Meanwhile, for the sake of distinction with other components in the drawings, the color filters CFa, CFb and CFc overlapping the first, third and fifth pixel units PX1, PX3 and PX5 are separately shown in FIG. 21.

The liquid crystal display device shown in FIG. 20, unlike the liquid crystal display device shown in FIG. 3 and the liquid crystal display device shown in FIG. 14, does not include black matrices BM1 and BM2. More specifically, the black matrices BM1 and BM2 may be replaced by two color filters CFa and CFb. That is, in an area where no image is displayed, the two color filters CFa and CFb may be disposed to overlap each other. In an embodiment, the two overlapping color filters CFa and CFb may be a red color filter and a blue color filter, respectively. That is, it is possible to prevent light from being transmitted through an area where no image is displayed by overlapping a color filter transmitting red light and a color filter transmitting blue light.

However, the two color filters CFa and CFb disposed to overlap each other do not overlap the first contact hole CNT1, the third contact hole CNT3, and the fifth contact hole CNT5. Meanwhile, the plurality of column spacers CS1*a*, CS3*a*, CS5*a* including the first column spacer CS1*a* may be disposed to overlap the plurality of contact holes including the first contact hole CNT1, the third contact hole CNT3 and the fifth contact hole CNT5, and may be made of a light blocking material. Here, the kind of the light blocking material is not particularly limited as long as it can block light, and examples thereof may include a photosensitive composition, an organic material, and a metallic material.

Thus, it is possible to prevent light from leaking to the outside in an area overlapping the plurality of contact holes including the first contact hole CNT1, the third contact hole CNT3, and the fifth contact hole CNT5.

Meanwhile, the plurality of column spacers including the first column spacer CS1a may be arranged so as not to overlap the first edge PE1b4 by a predetermined distance. Further, the thickness of the first stem PE1b1 may be about 5 um or more, and one of the plurality of first branches PE1b3 may be directly connected with the first edge PE1b4. Thus, it is possible to prevent the occurrence of cracks in the first stem PE1b1.

As described above, according to the embodiments, it is possible to prevent the occurrence of cracks in the pixel electrode.

Further, it is possible to reduce the reflectance due to external light and improve a contrast ratio.

The features of the inventive concept are not limited by the foregoing, and other various features are anticipated herein.

Although the embodiments have been disclosed for illustrative purposes, those skilled in the art will appreciate that various modifications, additions and substitutions are possible, without departing from the scope and spirit of the inventive concept as disclosed in the accompanying claims.

What is claimed is:

1. A display device, comprising:
a first substrate;
a gate line disposed on the first substrate and extending in a first direction;
a switching element disposed on the first substrate and electrically connected to the gate line;
an insulation layer disposed on the switching element;
a pixel electrode disposed on the insulation layer, wherein the pixel electrode comprises a contact portion overlapping at least a portion of the switching element exposed through a contact hole of the insulation layer, and a body portion electrically connected with the contact portion; and
a black matrix disposed on the insulation layer, the black matrix extending in the first direction and overlapping the gate line,
wherein the body portion comprises a first stem extending in the first direction, a second stem extending in a second direction intersecting the first direction and connected to the first stem, a plurality of branches extending from one of the first stem and the second stem and extending in a direction different from the first direction and the second direction, and an edge disposed between the first stem and the contact portion, connected to a side of the first stem and extending in the second direction,
wherein edges of distal ends of at least two of the plurality of branches face the edge of the body portion along the first direction,
wherein the edges of the distal ends of the at least two of the plurality of branches are spaced apart from the edge of the body portion along the first direction,
wherein an edge of a distal end of at least one of the plurality of branches connects to the edge of the body portion along the first direction, and
wherein the black matrix is spaced apart from the edge of the body portion by a first distance in a plan view.

2. The display device of claim 1,
wherein the black matrix does not overlap the edge of the body portion.

3. The display device of claim 1,
wherein the first distance is 2 um or more.

4. The display device of claim 1,
wherein at least one of the plurality of branches is directly connected with the edge of the body portion.

5. The display device of claim 1,
wherein a width of the first stem in the second direction is wider than a width of the second stem in the first direction.

6. The display device of claim 1, further comprising:
a column spacer disposed on the black matrix and including the same material as the black matrix,
wherein the edge of the body portion does not overlap the column spacer.

7. The display device of claim 6,
wherein the column spacer overlaps the switching element.

8. The display device of claim 1
wherein the black matrix overlaps the contact portion of the pixel electrode and the contact hole.

9. The display device of claim 1,
wherein the contact portion is directly connected with the edge of the body portion.

10. The display device of claim 1,
wherein the pixel electrode further includes a connection portion directly connected with the contact portion and the edge of the body portion.

11. The display device of claim 1, further comprising:
a data line disposed on the first substrate, insulated from the gate line and extending in the second direction, the data line electrically connected to the switching element;
wherein the pixel electrode includes a first side extending in the first direction and a second side extending in the second direction, and
the first side is longer than the second side.

* * * * *